(12) United States Patent
Wottowa et al.

(10) Patent No.: US 8,712,804 B2
(45) Date of Patent: Apr. 29, 2014

(54) ACCOUNT AND CUSTOMER CREATION IN AN ON-LINE BANKING MODEL

(75) Inventors: Kennard L. Wottowa, Chicago, IL (US); Michael Henry, San Francisco, CA (US); William E. Storts, Tavernier, FL (US)

(73) Assignee: Accenture Global Services Limited, Dublin (IE)

( * ) Notice: Subject to any disclaimer, the term of this patent is extended or adjusted under 35 U.S.C. 154(b) by 288 days.

(21) Appl. No.: 12/878,682

(22) Filed: Sep. 9, 2010

(65) Prior Publication Data

US 2011/0010203 A1    Jan. 13, 2011

Related U.S. Application Data

(63) Continuation of application No. 12/043,528, filed on Mar. 6, 2008, now Pat. No. 7,813,983, which is a continuation of application No. 09/551,238, filed on Apr. 17, 2000, now abandoned.

(51) Int. Cl.
*G06Q 40/00* (2012.01)

(52) U.S. Cl.
USPC .................................. 705/4; 705/30

(58) Field of Classification Search
USPC ...................................... 705/3–44
See application file for complete search history.

(56) References Cited

U.S. PATENT DOCUMENTS

| | | | |
|---|---|---|---|
| 5,465,206 A | 11/1995 | Hilt et al. | |
| 5,742,905 A | 4/1998 | Pepe et al. | |
| 5,794,234 A | 8/1998 | Church et al. | |
| 5,875,435 A | 2/1999 | Brown | |
| 5,897,625 A * | 4/1999 | Gustin et al. | 705/43 |
| 5,903,845 A | 5/1999 | Buhrmann et al. | |
| 5,903,881 A | 5/1999 | Schrader et al. | |
| 5,911,136 A * | 6/1999 | Atkins | 705/36 R |
| 5,978,780 A | 11/1999 | Watson | |
| 6,018,722 A * | 1/2000 | Ray et al. | 705/36 R |
| 6,058,170 A | 5/2000 | Jagadish et al. | |
| 6,202,054 B1 | 3/2001 | Lawlor et al. | |
| 6,289,322 B1 | 9/2001 | Kitchen et al. | |
| 6,345,261 B1 | 2/2002 | Feidelson et al. | |
| 6,354,490 B1 * | 3/2002 | Weiss et al. | 235/379 |
| 6,385,595 B1 | 5/2002 | Kolling et al. | |

(Continued)

FOREIGN PATENT DOCUMENTS

JP    4195256    7/1992

OTHER PUBLICATIONS

*Dayco* Statement Regarding Related Applications.

*Primary Examiner* — Frantzy Poinvil
(74) *Attorney, Agent, or Firm* — Finnegan, Henderson, Farabow, Garrett & Dunner, LLP

(57) ABSTRACT

A system, method and article of manufacture are provided for account and customer creation in an online banking model. An application is received from a customer. The application includes information relating to the user and also documentation relating to the user. A first computer is utilized to create a profile for the customer based on the application received from the customer. The first computer is also utilized to create an account for the customer. Information relating to the created profile and account is transmitted from the first computer to a second computer where a notification is generated. The notification indicates that the account has been created. The notification is transmitted from the second computer to the customer utilizing a network.

21 Claims, 43 Drawing Sheets

(56) References Cited

U.S. PATENT DOCUMENTS

| | | |
|---|---|---|
| 6,449,479 B1 | 9/2002 | Sanchez |
| 6,493,685 B1 | 12/2002 | Ensel et al. |
| 6,499,052 B1 * | 12/2002 | Hoang et al. ............... 709/203 |
| 6,598,027 B1 * | 7/2003 | Breen et al. ............. 705/26.25 |
| 7,120,592 B1 * | 10/2006 | Lewis ............................ 705/26 |
| 8,175,932 B2 * | 5/2012 | Zellner et al. .............. 705/26.2 |
| 8,229,800 B2 * | 7/2012 | Trotman et al. ............ 705/27.2 |
| 8,244,596 B2 * | 8/2012 | Klinger et al. ............. 705/26.7 |
| 8,346,678 B1 * | 1/2013 | Markarian et al. ........... 705/346 |

* cited by examiner

1208

3602

| Risk Profiler Questionaire |
|---|
| 1. What is your investment goal?<br>⊙ Save for Retirement<br>○ Save for home or major purchase<br>○ Save for children's education<br>○ Increase net worth |
| 2. What is the investment horizon for your goal (time until you need the funds)?<br>⊙ Short term (0-2 years)<br>○ Medium term (3-7 years)<br>○ Long Term |
| 3. What is your level of investment experience?<br>⊙ Have invested in Individual Equities<br>○ Have invested in Unit Trust but not Individual Equities<br>○ Have invested in Fixed Deposits but no Unit Trust or Individual Equities<br>○ Have not invested in any of the above |
| 4. What it your appetite for risk (assuming risk and return are closely related?<br>⊙ I am uncomfortable with any loss of my original investments<br>○ I am comfortable with a small portion of my asset in higher risk/higher return investments<br>○ I prefer to balance lower risk/lower return and higher risk/higher return investments<br>○ I prefer an aggressive portfolio emphasizing higher risk/higher return |
| 5. How would you react to a significant drop in the stock market<br>⊙ Increase my investment rate to take advantage of dips in the market<br>○ Do nothing as I expect the market to rebound over time<br>○ Do nothing as I only invest in Fixed Deposits and Bond Funds<br>○ Liquidate some of my holdings to prevent further loss of value<br>○ Liquidate all of my Equity and Unit Trust investments to prevent further loss of value |

3702 (top-left), 3704 (arrow to first option), 3706 (Back / Submit buttons)

Fig. 37

ACCOUNT AND CUSTOMER CREATION IN AN ON-LINE BANKING MODEL

CROSS REFERENCE TO RELATED APPLICATIONS

This is a continuation of U.S. patent application Ser. No. 12/043,528, filed Mar. 6, 2008, now U.S. Pat. No. 7,813,983 which is a continuation of U.S. patent application Ser. No. 09/551,238, filed Apr. 17, 2000, now abandoned, both of which are incorporated herein by reference in their entireties.

FIELD OF THE INVENTION

The present invention relates to banking and investing and more particularly to providing banking and investment services utilizing a network.

BACKGROUND OF THE INVENTION

Increasingly the public is going on-line for a variety of transactions and information. More than 30% of the population have personal computers and modems. Furthermore, over 60% of people with bank accounts have personal computers and modems. At the same time the number of people subscribing and using on-line services is greater than 40 million, and this number is growing at an exponential rate.

As the public uses computers with a greater frequency, more financial transactions are being automated and performed via computer. There is good motivation to bank on-line. On-line banking provides convenience, safety, cost savings, and potentially new types of services not readily or conveniently available via in-person banking. Such potentially new services include access to superior up-to-the minute information, on-line investment clubs, information filters, and search agents.

With the increase in the number of financial transactions performed on-line, the convenience and cost-savings of banking on-line also increases. Additionally new and more powerful methods are being developed for protecting the security of financial transactions performed on-line. The result is that convenience, cost savings and enhanced security have combined to make on-line financial services more useful and effective, thereby driving the development of newer and more integrated services. More sophisticated financial systems that offer greater integration and a high degree of user control enable on-line users to synthesize, monitor, and analyze a wide array of financial transactions and personal financial data.

Currently, methods exist for users to perform a variety of on-line financial transactions. These methods do not offer integrated personal financial accounting. For example, users may bank on-line, thereby enabling performance of transactions, such as transfers from one account to another. Additionally users may perform transactions on-line, such as stock or mutual fund purchases. In these approaches, users are able to perform certain basic financial transactions.

Additionally, methods exist for users to perform computerized personal financial accounting via a variety of personal financial software applications. These methods do not offer the user the ability to integrate on-line performance of financial transactions. For example, these software applications help users to categorize and keep track of financial expenses, tax information, or financial transactions. Generally these software applications require that users enter this financial information after such information has been recorded and collected by the user in a checkbook, accounting book, or another software application or to receive downloads. This includes downloads from different institutions with differing conventions, categories and level of detail.

The automated performance of financial transactions is separate and distinct from any computerized method of accounting. Thus, a user can bank on-line, but cannot easily take that transaction information and readily transfer it into a computer application for financial accounting. Users may not be able to reconcile bank statements efficiently or quickly obtain a complete picture of their personal finances, such as monthly expenses and average monthly bank account balances.

Existing methods for financial transaction performance on-line do not combine the features of tracing and monitoring transactions with an integrated financial accounting software application. Without this integration, the user may not be able to readily and seamlessly combine on-line banking with personal financial accounting.

Generally, consumers must rely on others for financial advice. A need exists for users to have a quick and efficient way to integrate all of their financial information and for such information to be distilled and analyzed efficiently and thoroughly.

A useful method of assisting the integration and analysis of information, such as financial information, is by incorporating intelligent agents into an information system. An intelligent agent is a computer program that can perform a variety of tasks for a computer user. Typically a computer user will instruct an intelligent agent to assist the user by automatically performing a function and reporting the results of that performed function and/or take an action. Intelligent agents have been used for such things as negotiating transactions on behalf of users, reducing information overload for computer users, and handling and prioritizing electronic mail on behalf of users. In each case, intelligent agents have been employed to automatically perform tasks for users that would otherwise require the users' constant and immediate attention. The result is that intelligent agents enable users to utilize time more efficiently and to obtain results and analysis quickly and without the users' constant attention to the task being performed by the intelligent agent.

One current approach of utilizing intelligent agents in an information system is to place agents in the role of finalizing, verifying, or closing a transaction. This approach employs agents within the stream of electronic commerce.

Another approach of using intelligent agents in an information system is to incorporate agents in a telephone or communications network. This method of using agents focuses on the agents that can route telephone calls or send messages through a communication system.

One system utilizes agents to participate in an electronic dialogue and agree on terms of payment for a product or a service or to verify a form of identification. In this system, agents are embedded in a transaction device that reviews electronic information presented by a customer for the purpose of accepting a payment or for verifying electronic identification presented by a user.

Another system uses an intelligent agent to follow the preferences and organizational considerations of the user in presenting and prioritizing electronic mail to users.

In a further system, intelligent agents are used to interface with a network and deliver status messages to permit transmission and routing of communications signals.

None of the prior art methods utilize intelligent agents within an information system for the purpose of integrating and analyzing details of financial transactions and financial accounting across institutions, and taking appropriate actions, where the agent relieves the user of much of the routing details and learns and adapts.

BRIEF SUMMARY OF THE INVENTION

A system, method and article of manufacture are provided for account and customer creation in an online banking model. An application is received from a customer. The application includes information relating to the user and also documentation relating to the user. A first computer is utilized to create a profile for the customer based on the application received from the customer. The first computer is also utilized to create an account for the customer. Information relating to the created profile and account is transmitted from the first computer to a second computer where a notification is generated. The notification indicates that the account has been created. The notification is transmitted from the second computer to the customer utilizing a network.

In an embodiment of the present invention, an application form may be transmitted to the customer utilizing the network prior to receipt of the completed application. In another embodiment of the present invention, an identifier may be associated with the created profile. Information material for the customer may also be generated utilizing the second computer. The generated information material includes the identifier associated with the customer. The information material with the identifier is then printed using a printer coupled to the second computer to form welcome kit which can then be mailed to the customer.

In an aspect of the present invention, the creation of the profile for the customer may include the generating of an identifier associated with the customer utilizing the first computer. In another embodiment of the present invention, the customer profile may be associated with the created account to identify the customer as an account holder of the account. As an option, a plurality of customer profiles may be associated with the created account.

In another aspect of the present invention, the information relating to the customer included in the application may include personal information about the customer and/or employment history of the customer. In a further aspect of the present invention, the notification may be transmitted to the user in an electronic mail (e-mail) message.

In even another embodiment of the present invention, a portion or all of the information included in the application may be inputted into the first computer prior to generation of the customer profile. In yet another embodiment of the present invention, the created profile and account may be stored in a database coupled to the first computer.

BRIEF DESCRIPTION OF THE DRAWINGS

The invention will be better understood when consideration is given to the following detailed description thereof. Such description makes reference to the annexed drawings wherein:

FIG. 37 is a schematic illustration of an exemplary risk profiler questionnaire page in accordance with an embodiment of the present invention;

DETAILED DESCRIPTION OF THE INVENTION

Embodiments of the present invention may serve to help develop a new business franchise through a new fighting brand and independent financial institution based on the buyer advocate model with the possibility of increasing overlap with a bank in the area of products and customers. New market segments may be served with a new financial services experience—access to wider range of products and services with one-stop convenience. Also, branding based on a unique positioning may be possible to achieve instant and enduring relationships with customers. Embodiments of the present invention may also serve to provide online customers with financial products backed by tools, guidance and service to help them establish and achieve their financial goals.

Figure 1:
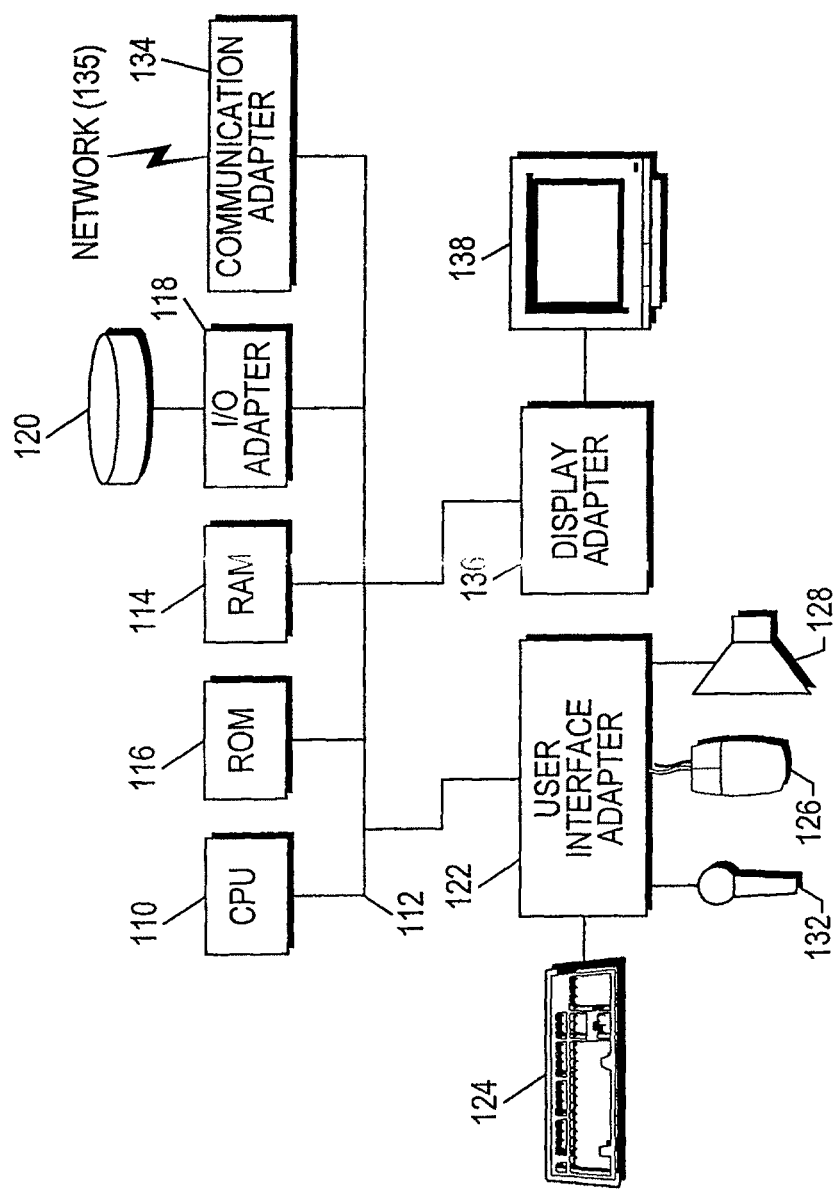
FIG. 1 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network 135) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 2:
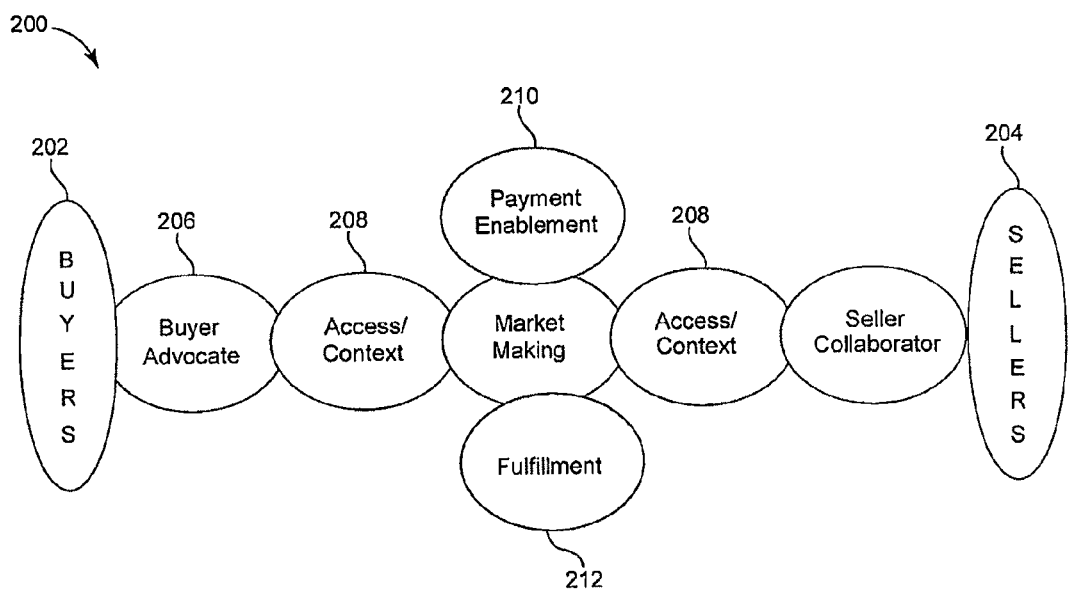
FIG. 2 is a schematic illustration of an electronic commerce ("eCommerce") value chain for an online banking model in accordance with an embodiment of the present invention.

FIG. 2 is a schematic illustration of an electronic commerce ("eCommerce") value chain 200 for an online banking model in accordance with an embodiment of the present invention. The eCommerce value chain provides new roles and opportunities in the eEconomy market space between buyers 202 and sellers 204. For example, a buyer advocate 206 may serve as a Consumer Guide to financial services (i.e. find the best deal). Access/Context 208 is also included in the eCommerce value chain for providing: on-line quotations, value-added services (e.g. Quicken downloads, Bill Presentment), applying for Credit Cards, Loans, Life Insurance, buying UT and general insurance on-line, and trading stocks, FX thru a linked brokerage. The eCommerce value chain further provides for Payment Enablement 210 for allowing a cash management account to transact, and purchase financial products on-line. Additionally, the eCommerce value chain can provide fulfillment 212 by completing transactions for UT and insurance on behalf of the customer.

Figure 3:
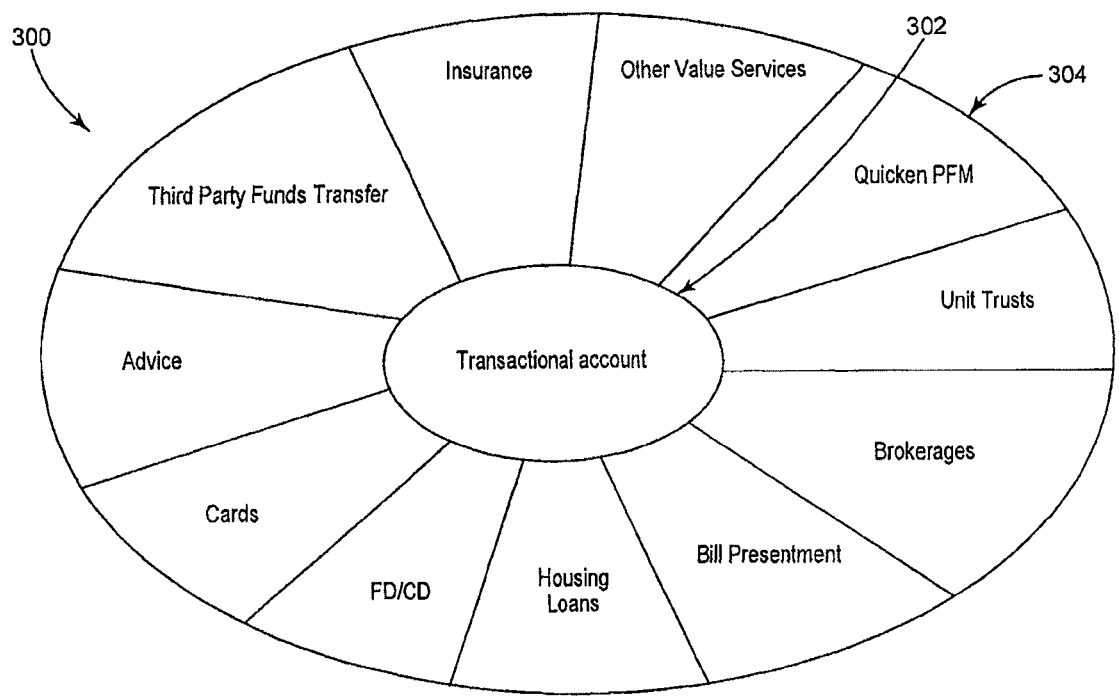
FIG. 3 is a schematic diagram of a relationship between a transactional account and services of an online banking model in accordance with an embodiment of the present invention.

FIG. 3 is a schematic diagram of a relationship 300 between a transactional account and services of an online banking model in accordance with an embodiment of the present invention. A central financial facility manages the transaction processing account 302 while other financial services products 304 may be outsourced. This relationship allows for the central financial facility to focus on its core competency in marketing, customer relationship management, alliance management, product and package design, and Internet and electronic interface design. This relationship also allows the central financial facility to outsource services outside its core competency such as, for example, back office processing and product manufacture.

Figure 4:
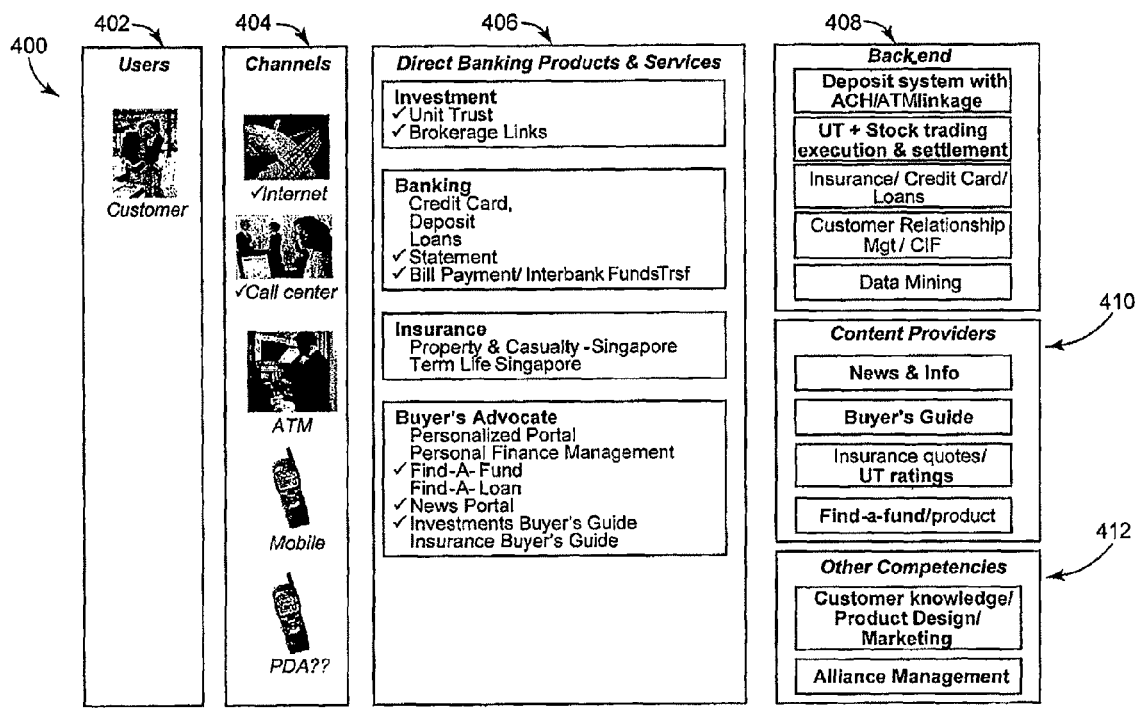
FIG. 4 is a schematic diagram of banking capabilities of an online banking model in accordance with an embodiment of the present invention.

FIG. 4 is a schematic diagram of banking capabilities 400 of an online banking model in accordance with an embodiment of the present invention. With an online banking model, a user 402 can utilize various channels 404 to access direct banking offerings 406 (e.g., products and services). The online banking model utilizes back end supporters 408, content providers 410, and other competencies 412 (such as customer knowledge/product design/marketing and alliance management) to support the direct banking offerings 406.

Figure 5:
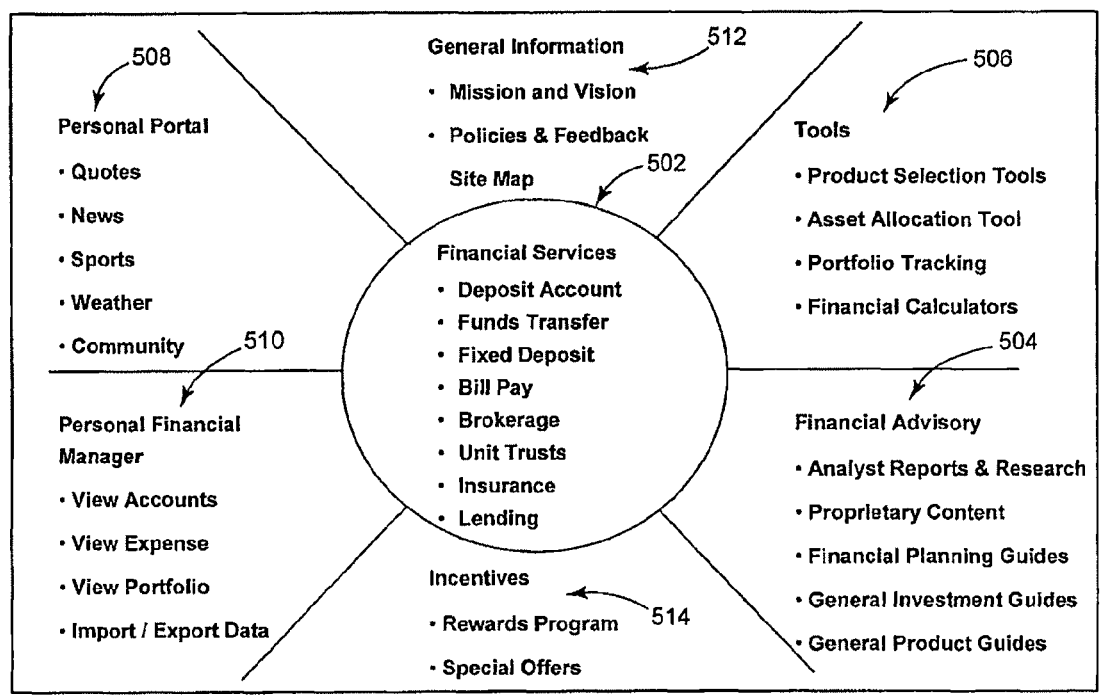
FIG. 5 is a schematic illustration of features and services of an online banking model in accordance with an embodiment of the present invention.

FIG. 5 is a schematic illustration of features and services of an online banking model in accordance with an embodiment of the present invention. Financial services 502 of the online banking model may include for example: providing deposit accounts, facilitating funds transfer, permitting customers to invest in Unit Trusts (i.e., investment funds), provide information utilizing a network such as news, sports, weather and stock quotes, provide information and education about offerings available via the online banking model. Other features that may be provided include, for example, ATM, bill payment services, checking accounts, fixed deposits, brokerage services, credit cards, insurance offerings, and lending services.

In one embodiment of the present invention, the online banking model may also provide basic financial advisory content 504. The online banking model may further provide various tools 506 such as for example, a fund selection tool, an asset allocation tool, a portfolio tracking/planning tool, and one or more financial calculators.

In an aspect of the present invention, the online banking model may additionally provide customers with Internet access, SMS Phone Messaging, call center services, and e-mail services, enhanced offering information and education, enhanced advisory content, product configuration tools, community tools such as chat rooms and bulletin boards, Mobile Phone transactions, and instant messaging utilizing the network. The online banking model may also provide personal portal features 508 for the customer, a personal financial manager 510 for the customer, general information about the online banking model 512 for the customer as well as offering incentives 514 for increasing the use of the services by the customer.

Figure 6:
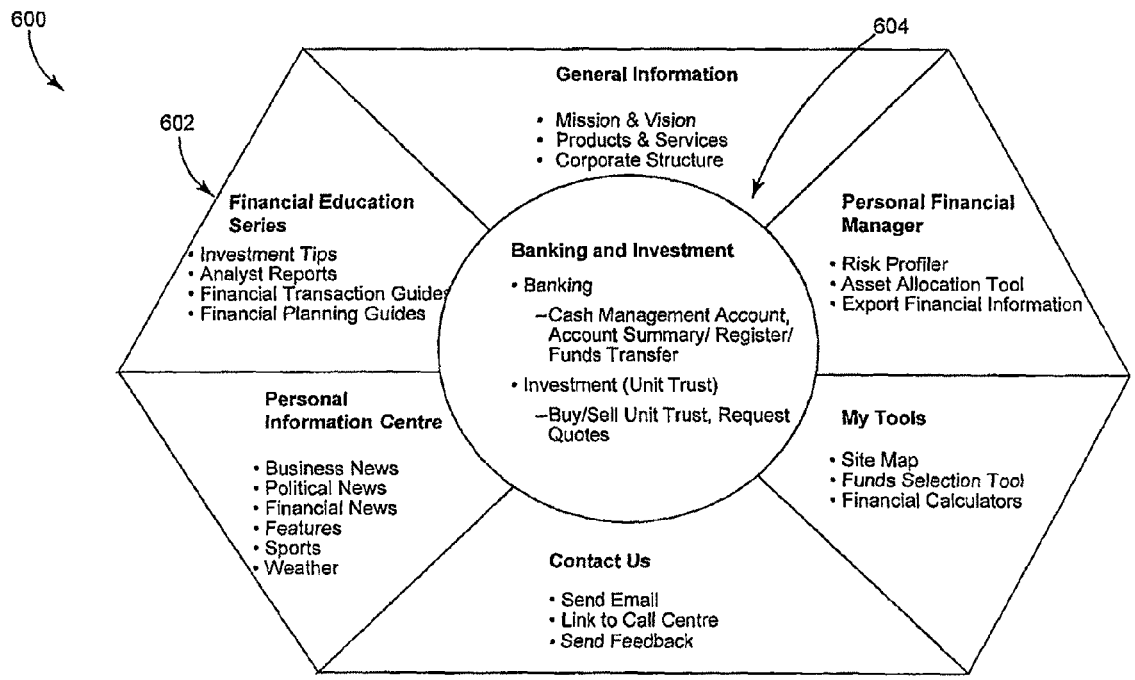
FIG. 6 is a schematic diagram of market offerings that may be provided in an online banking model in accordance with an embodiment of the present invention.

FIG. 6 is a schematic diagram of market offerings 600 that may be provided in an online banking model in accordance with an embodiment of the present invention. Such market items allow the online banking model provider to possess the initial business capabilities to demonstrate and achieve for its customers a one-stop banking experience, access to an extensive choice of financial products and services. Market offerings include relationship and retention-linked market offerings and portal services 602, as well as core market offerings 604 such as banking and investment services.

In accordance with an embodiment of the present invention, the Internet may be the main delivery channel for an online banking model supported by a call center for basic inquiries and navigational assistance.

Figure 7:
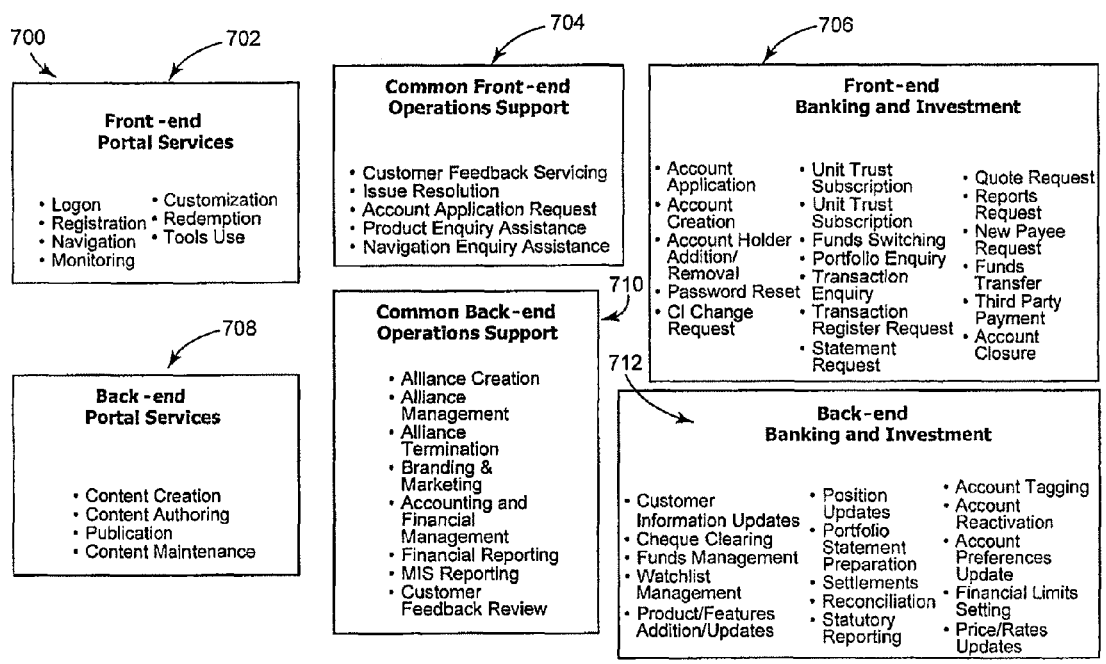
FIG. 7 is a schematic diagram of an operations blueprint for an online banking model in accordance with an embodiment of the present invention.

FIG. 7 is a schematic diagram of an operations blueprint 700 for an online banking model in accordance with an embodiment of the present invention. The business operations of the online banking model encompass both front end 702, 704, 706 and backend processes 708, 710, 712 as well outsourced operations. Some illustrative examples of processes include portal services 702, 708, operations support processes 704, 710, and banking and investment processes 706, 712.

Figure 8:
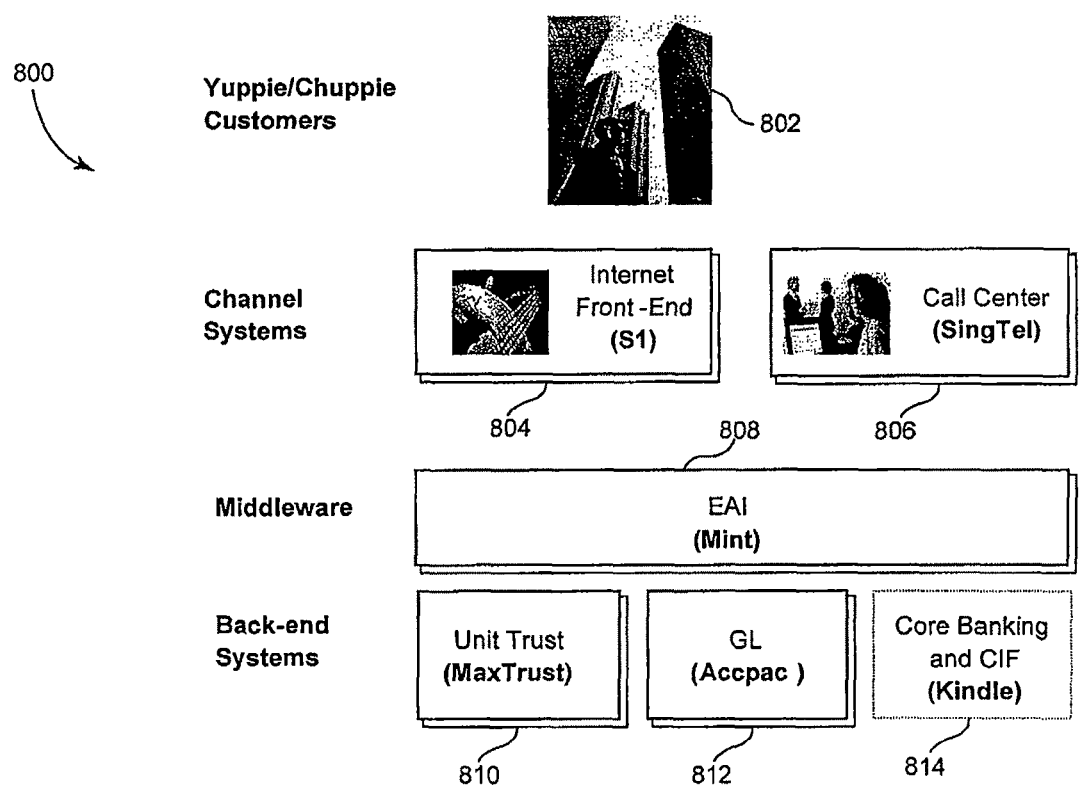
FIG. 8 is a schematic diagram of a representative technology blueprint of an online banking model in accordance with an embodiment of the present invention.

FIG. 8 is a schematic diagram of a representative technology blueprint 800 of an online banking model in accordance with an embodiment of the present invention. In this blueprint are customers 802 which connect to the online banking model utilizing channel systems such the Internet 804 and the call center 806 to access middleware 808 (such as EAI) which is supported by back end systems such as a Unit Trust 810, GL 812, and Core Banking/CIF 814.

Figure 9:
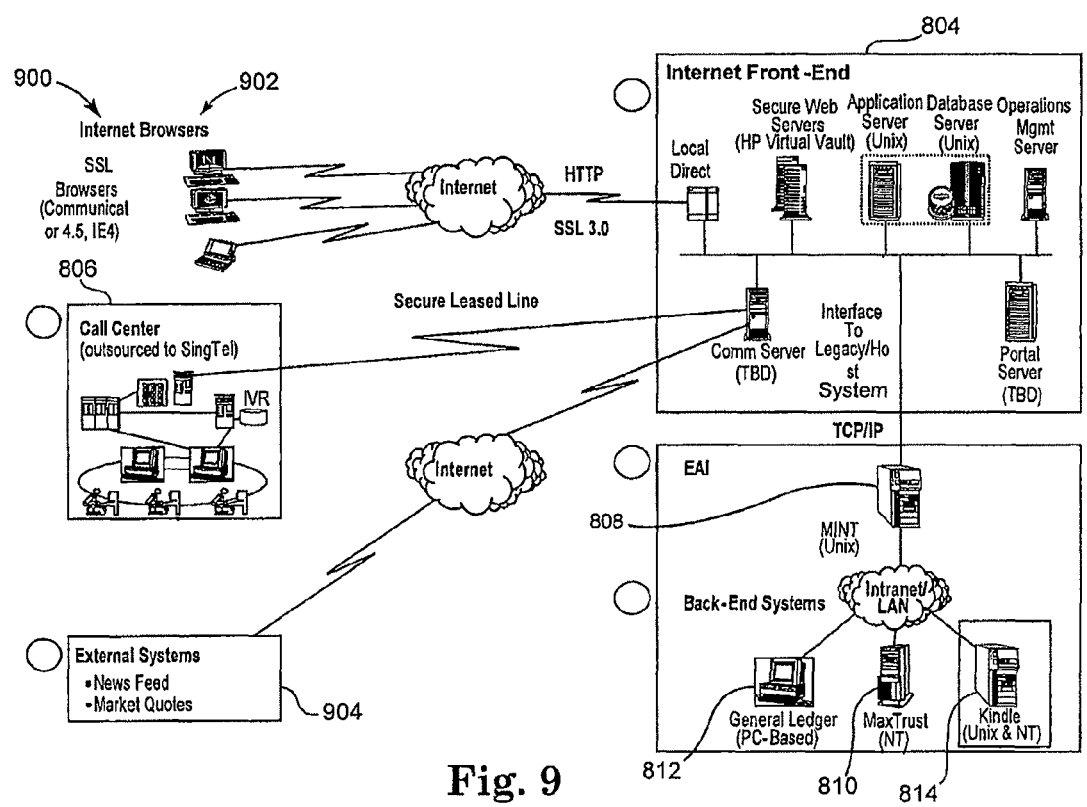
FIG. 9 is a schematic diagram of an architecture for an online banking model in accordance with an embodiment of the present invention.

FIG. 9 is a schematic diagram of an architecture 900 for an online banking model in accordance with an embodiment of the present invention. Customers may access the Internet front end 804 utilizing the Internet and an Internet browser 902 on their computer. The Internet front end 804 may also be access utilizing the call center 806 utilizing a network such as a secure line. The Internet front end 804 is coupled to the middleware 808 which, in turn, is coupled to the backend systems 810, 812, 814 utilizing a network such as an Intranet/LAN. External systems 904 such as news feeds and market quotes may also be coupled to the Internet front end 804 utilizing the Internet.

Figure 10:
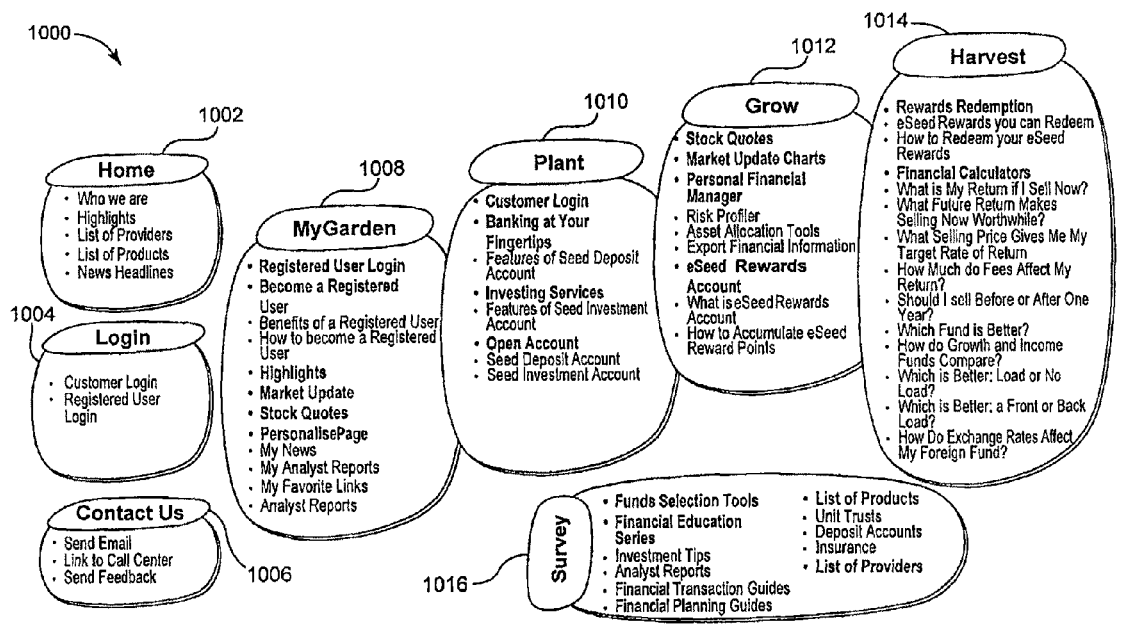
FIG. 10 is a schematic diagram of a metaphor that may be used to describe an online banking model in accordance with an embodiment of the present invention.

FIG. 10 is a schematic diagram of a metaphor 1000 that may be used to describe an online banking model in accordance with an embodiment of the present invention. The market offerings and the requisite business capabilities are web-enabled through the metaphor of a "gardening" or "farming" experience. This metaphor may include a home page 1002, a login page 1004, a contact us page 1006, a My Garden page 1008, a plant page 1010, a grow page 1012, a harvest page 1014 and a survey page 1016. As illustrated in FIG. 10, various processes, features and offerings associated with each element of the metaphor are listed under each respective element.

Figure 11:
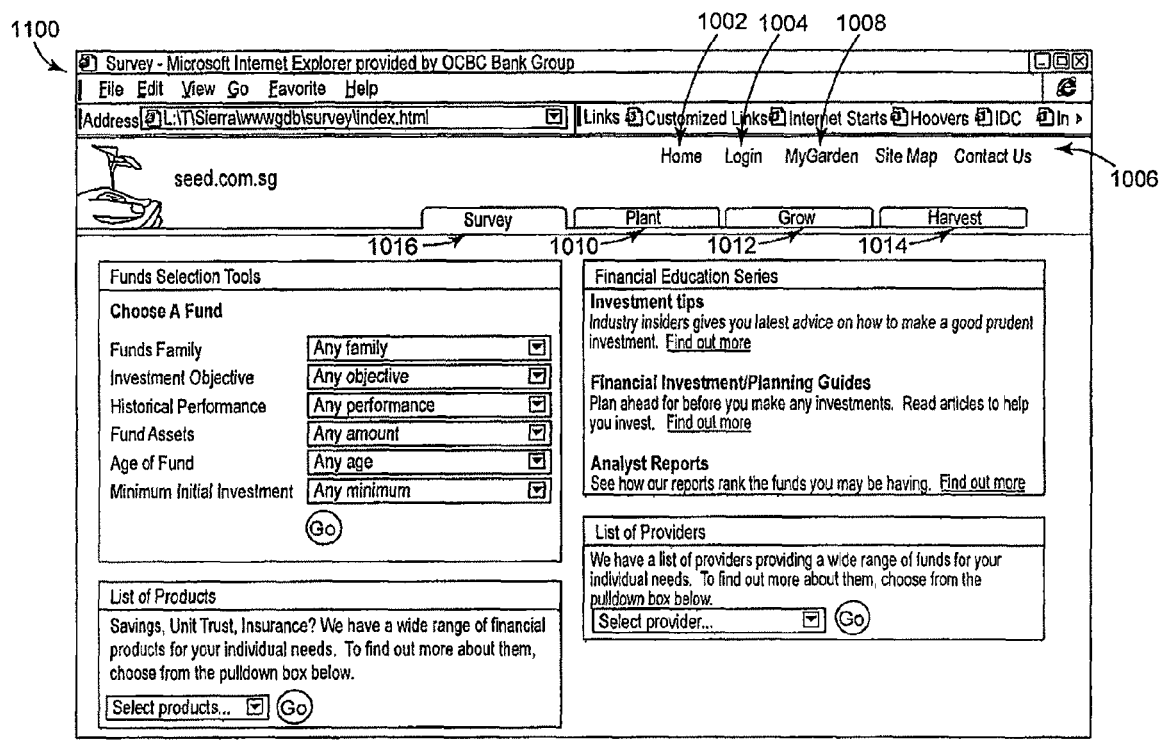
FIG. 11 is a schematic illustration of an exemplary web page for an Internet portal of an online banking model using a gardening metaphor in accordance with an embodiment of the present invention.

FIG. 11 is a schematic illustration of an exemplary web page 1100 for an Internet portal of an online banking model using the gardening metaphor in accordance with an embodiment of the present invention. This web page 1100 may have links for accessing each of the pages described in FIG. 10. For example, the web page may display links for accessing the home page 1002, the login page 1004, the contact us page 1006, the My Garden page 1008, the plant page 1010, the grow page 1012, the harvest page 1014 and the survey page 1016.

Figure 12A:
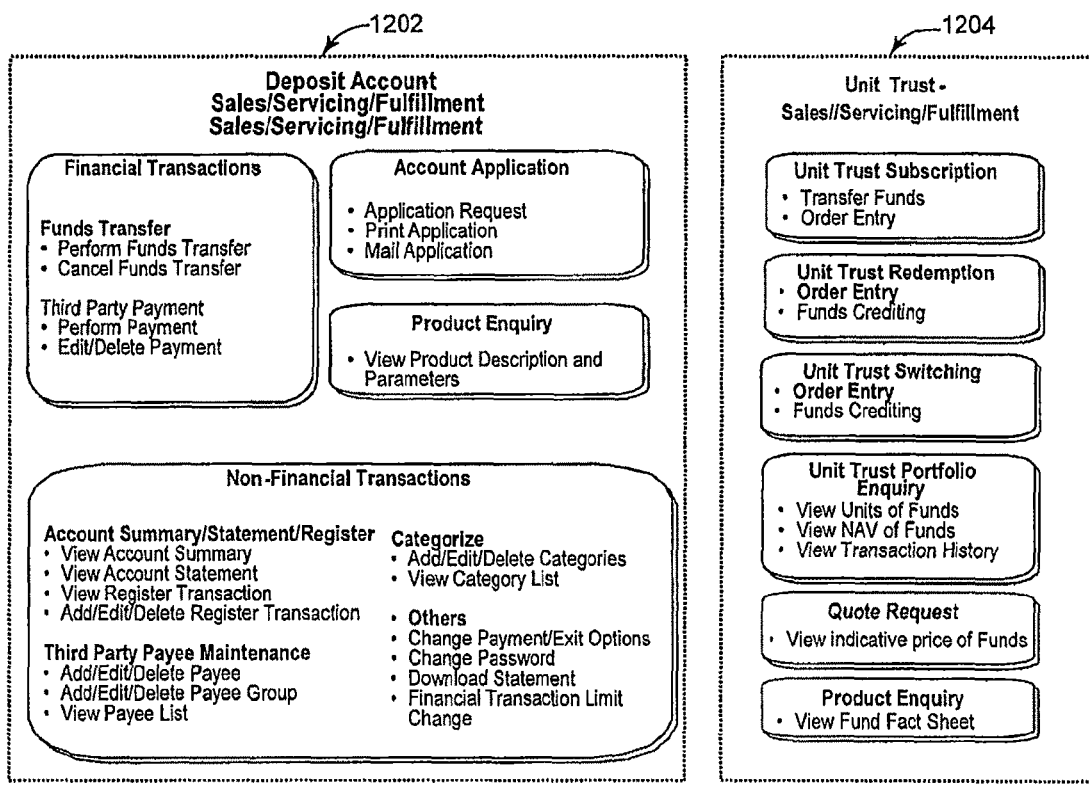
FIG. 12 is a schematic organizational diagram of banking, investment and call center services of an online banking model in accordance with an embodiment of the present invention.
Figure 12B:
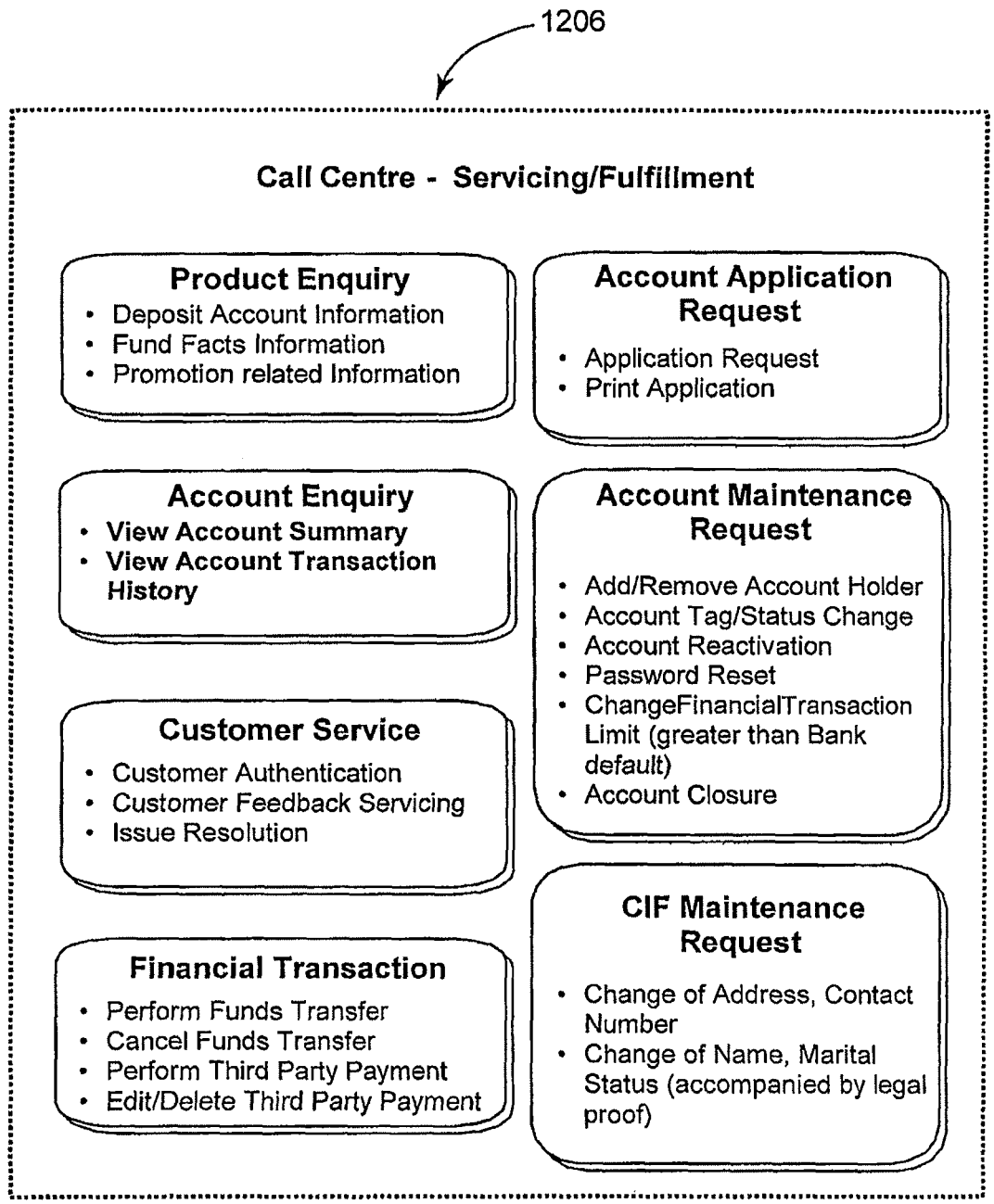
Figure 12C:
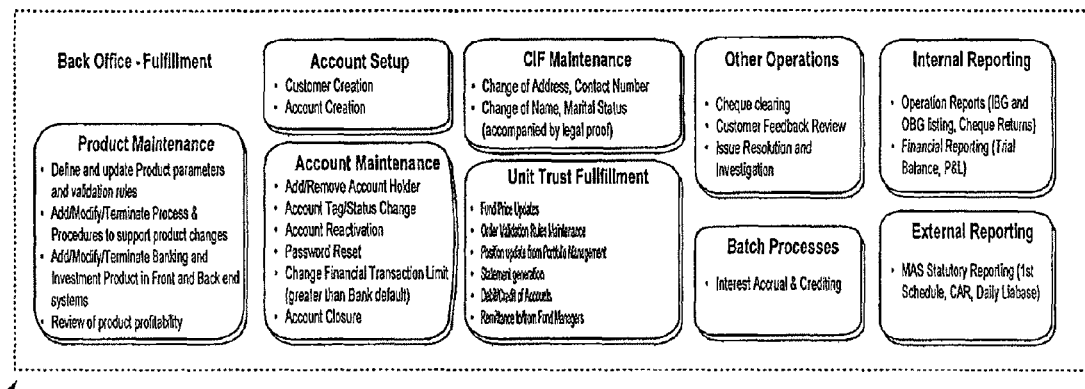

FIG. 12 is a schematic organizational diagram of banking, investment and call center services of an online banking model in accordance with an embodiment of the present invention. The banking, investment and call center services of the online banking model may include deposit account sales, servicing and fulfillment services 1202, Unit Trust sales, servicing and fulfillment services 1204, call center servicing and fulfillment services 1206, and Back Office fulfillment services 1208.

Figure 13:
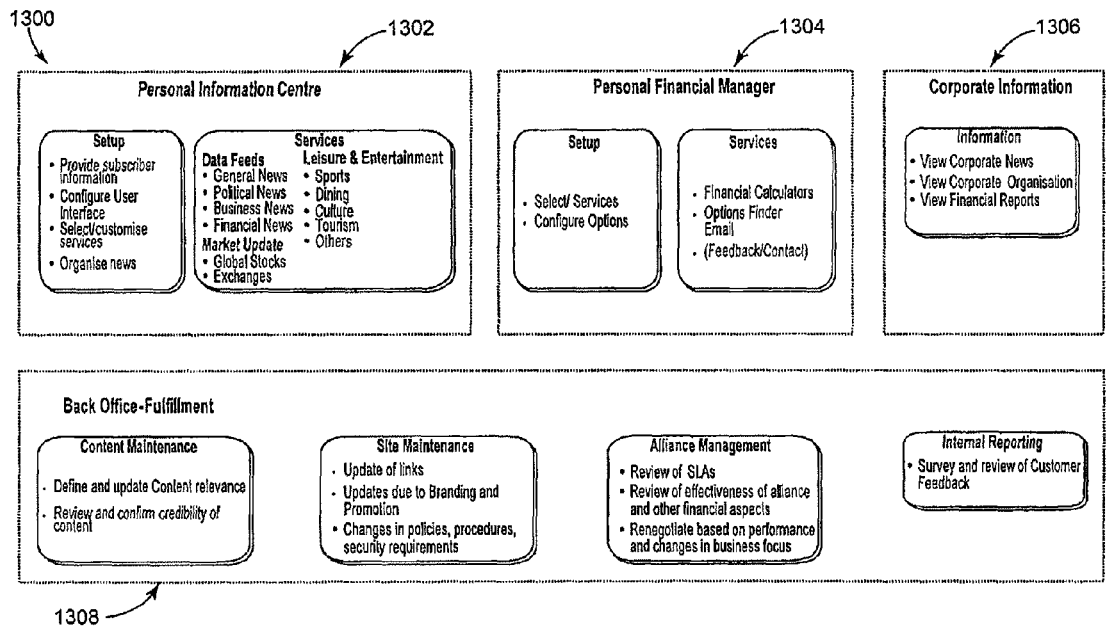
FIG. 13 is a schematic diagram of portal services that may be provided in an online banking model in accordance with an embodiment of the present invention.

FIG. 13 is a schematic diagram of portal services 1300 that may be provided in an online banking model in accordance with an embodiment of the present invention. Some illustrative portal services may include personal information center services 1302, personal financial manager services 1304, corporate information services 1306, and back office fulfillment services 1308 for supporting the portal.

Figure 14:
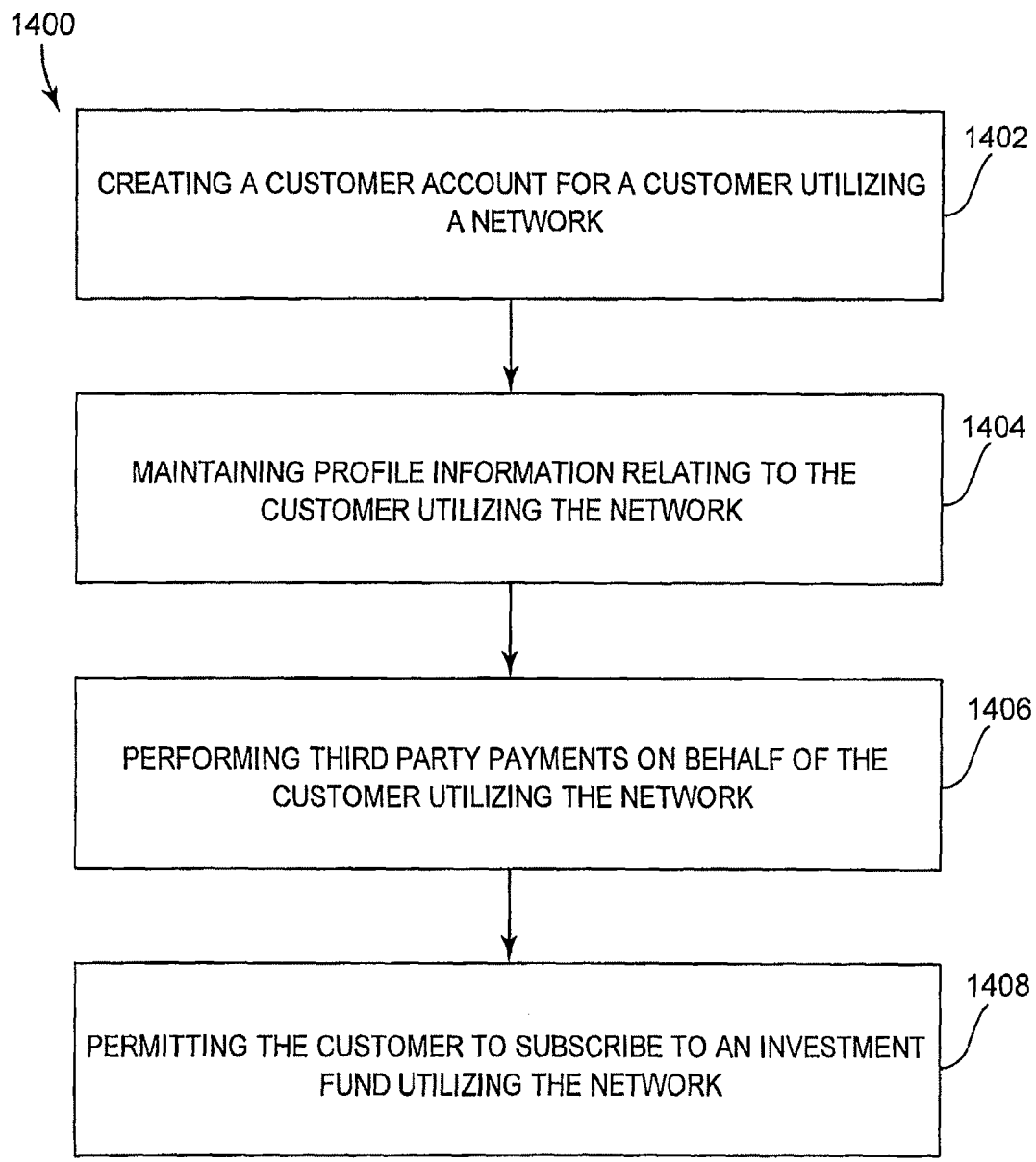
FIG. 14 illustrates a flowchart for a process for conducting banking utilizing a network in an online banking model in accordance with an embodiment of the present invention.

FIG. 14 illustrates a flowchart for a process 1400 for conducting banking utilizing a network in an online banking model in accordance with an embodiment of the present invention. A customer account is created for a customer utilizing a network in operation 1402. Profile information relating to the customer is also maintained utilizing the network in operation 1404. The network is also utilized to perform third party payments on behalf of the customer in operation 1406. The customer further permitted to subscribe to an investment fund utilizing the network in operation 1408.

Figure 15:
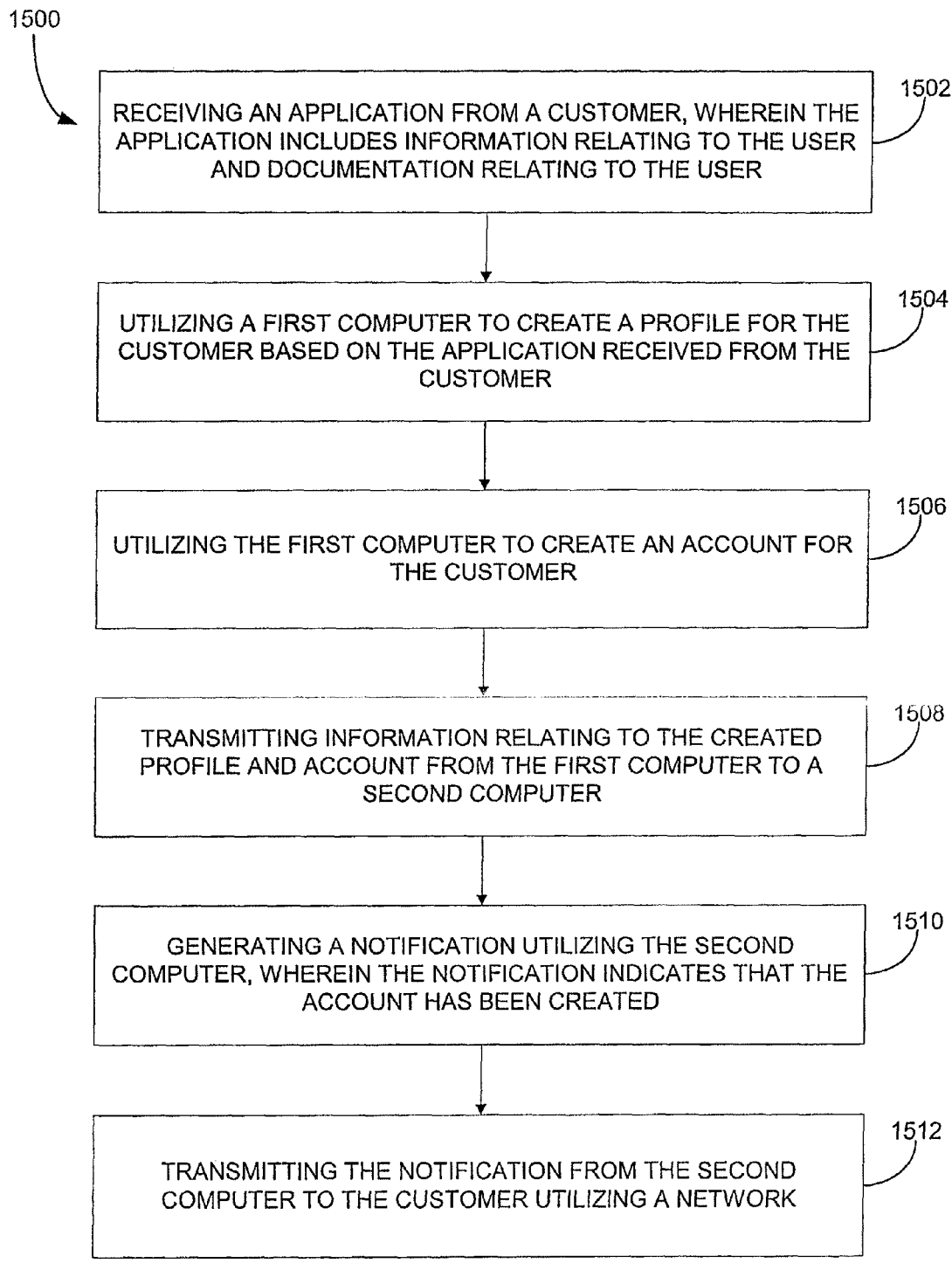
FIG. 15 illustrates a flowchart for a process for account and customer creation in an online banking model in accordance with an embodiment of the present invention.

FIG. 15 illustrates a flowchart for a process 1500 for account and customer creation in an online banking model in accordance with an embodiment of the present invention. An application is received from a customer in operation 1502. The application includes information relating to the user and also documentation relating to the user. In operation 1504, a first computer is utilized to create a profile for the customer based on the application received from the customer. The first computer is also utilized to create an account for the customer in operation 1506. Information relating to the created profile and account is transmitted in operation 1508 from the first computer to a second computer where a notification is generated in operation 1510. The notification indicates that the account has been created. The notification is transmitted from the second computer to the customer utilizing a network in operation 1512.

In an embodiment of the present invention, an application form may be transmitted to the customer utilizing the network prior to receipt of the completed application. In another embodiment of the present invention, an identifier may be associated with the created profile. Information material for the customer may also be generated utilizing the second computer. The generated information material includes the identifier associated with the customer. The information material with the identifier is then printed using a printer coupled to the second computer to form welcome kit which can then be mailed to the customer.

In an aspect of the present invention, the creation of the profile for the customer may include the generating of an identifier associated with the customer utilizing the first computer. In another embodiment of the present invention, the customer profile may be associated with the created account to identify the customer as an account holder of the account. As an option, a plurality of customer profiles may be associated with the created account.

In another aspect of the present invention, the information relating to the customer included in the application may include personal information about the customer and/or employment history of the customer. In a further aspect of the present invention, the notification may be transmitted to the user in an electronic mail (e-mail) message.

In even another embodiment of the present invention, a portion or all of the information included in the application may be inputted into the first computer prior to generation of the customer profile. In yet another embodiment of the present invention, the created profile and account may be stored in a database coupled to the first computer.

Figure 16:
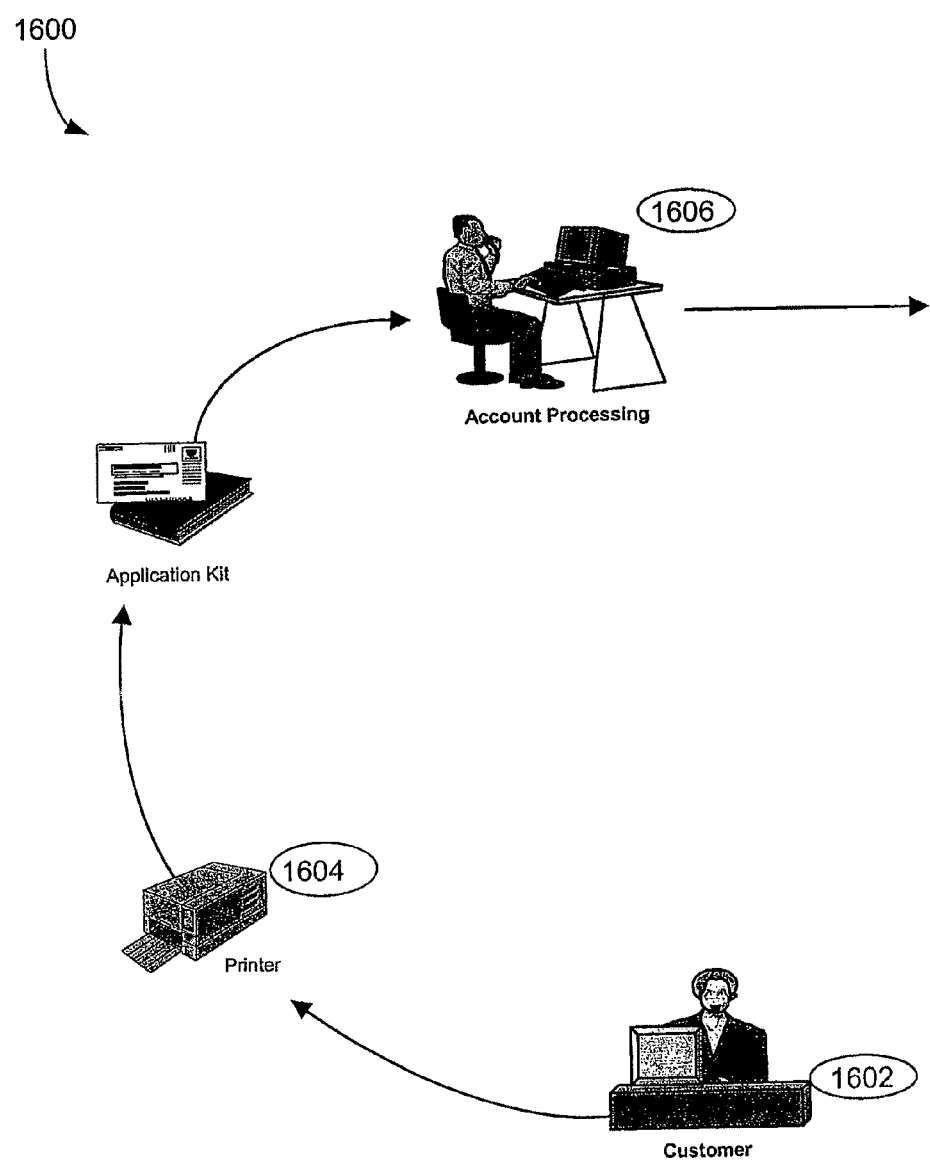
FIG. 16 is a schematic diagram of an account application process in accordance with an embodiment of the present invention.

FIG. 16 is a schematic diagram of an account application process 1600 in accordance with an embodiment of the present invention. In operation 1602, a customer goes to website and follows instructions to print and fill in application fowl. In operation 1604, the customer then prints out the pre-filled form, signs it, includes other required documentation (copy of Identity Card, check deposit, etc), and then mails in the Application Kit to Account Processing. Upon receipt of the Application Kit, customer creation and/or account creation processes may be executed (see 1606).

Figure 17:
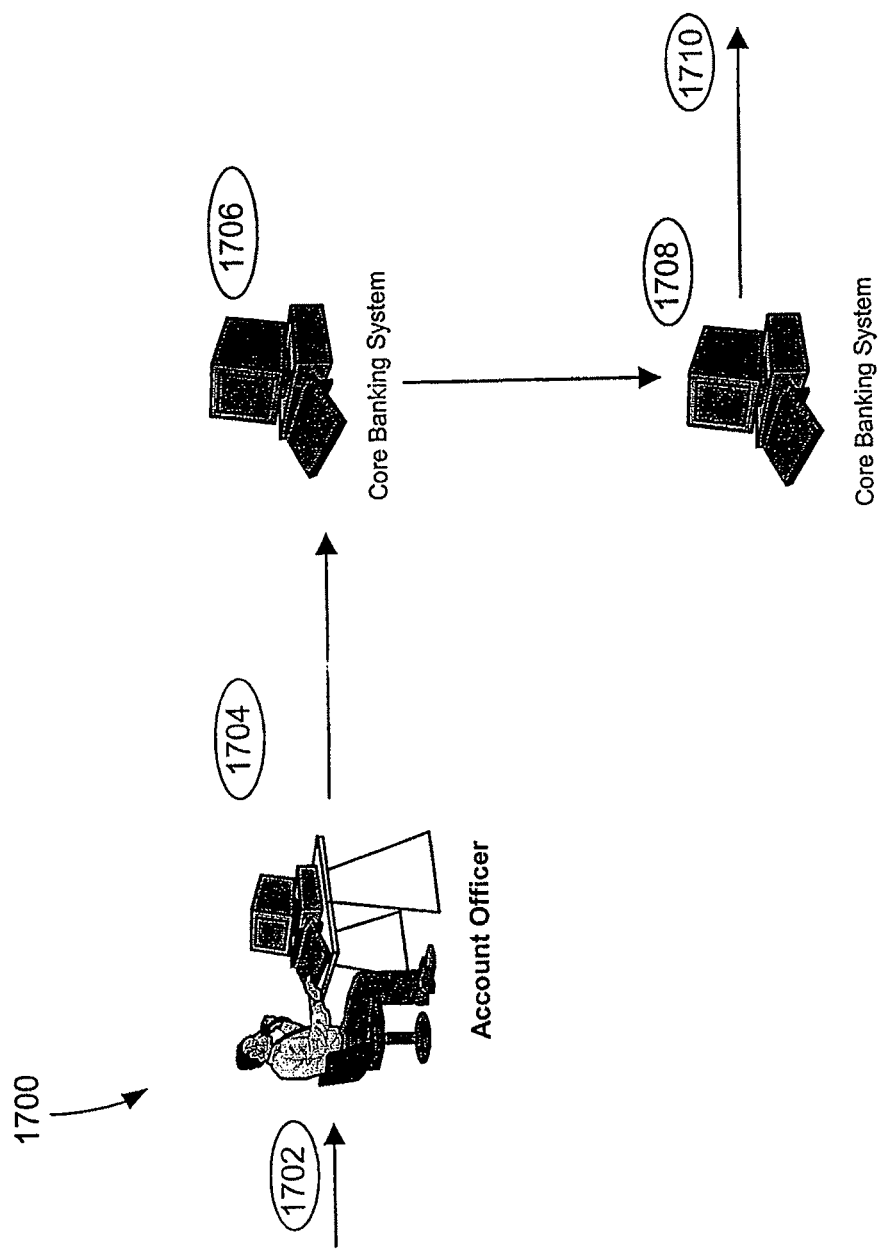
FIG. 17 is a schematic diagram of a customer creation process in accordance with an embodiment of the present invention.

FIG. 17 is a schematic diagram of a customer creation process 1700 in accordance with an embodiment of the present invention. The Application Kit of the account application process is received to initiate this process (see 1702). In operation 1704, an account officer reviews the account application, and if this is a new customer, the account officer will continue the customer creation process. In operation 1706, a unique CIF number is generated by the Core Banking System. In operation 1708, the account officer enters all relevant information (e.g. Personal Information, Employment History, etc) about the customer into the CBS from the application. After input of all of the relevant information, an account creation process may be initiated.

Figure 18:
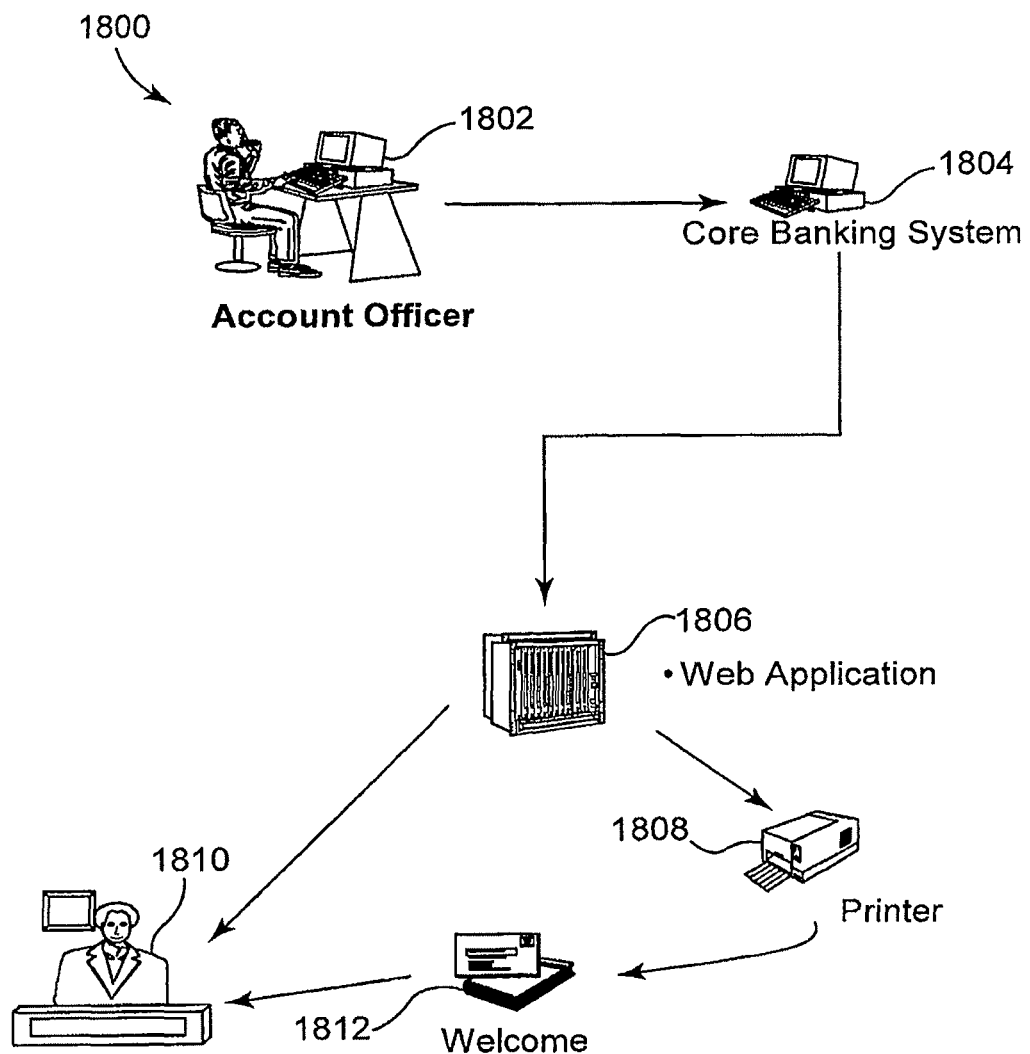
FIG. 18 is a schematic diagram of an account creation process in accordance with an embodiment of the present invention.

FIG. 18 is a schematic diagram of an account creation process 1800 in accordance with an embodiment of the present invention. In operation 1802, an officer reviews the application form to decide whether to approve or reject the application. In the application is approved, the officer then creates the customer (for first time customer—refer to customer creation process flow) and account in the Core Banking system in operation 1804. The officer also links the customer(s) to the account as account holders. In operation 1806, a web server is updated with new customer and account information. From the web server, a welcome kit is generated in operation 1808. At this time a file is downloaded for printing the PIN mailer which includes a personal identification number associated with the customer and the account. The PIN Mailer is included in the welcome packet. In operation 1810, the customer is notified via email regarding new account creation status. Subsequently, the complete Welcome Kit is mailed to the customer in operation 1812.

Figure 19:
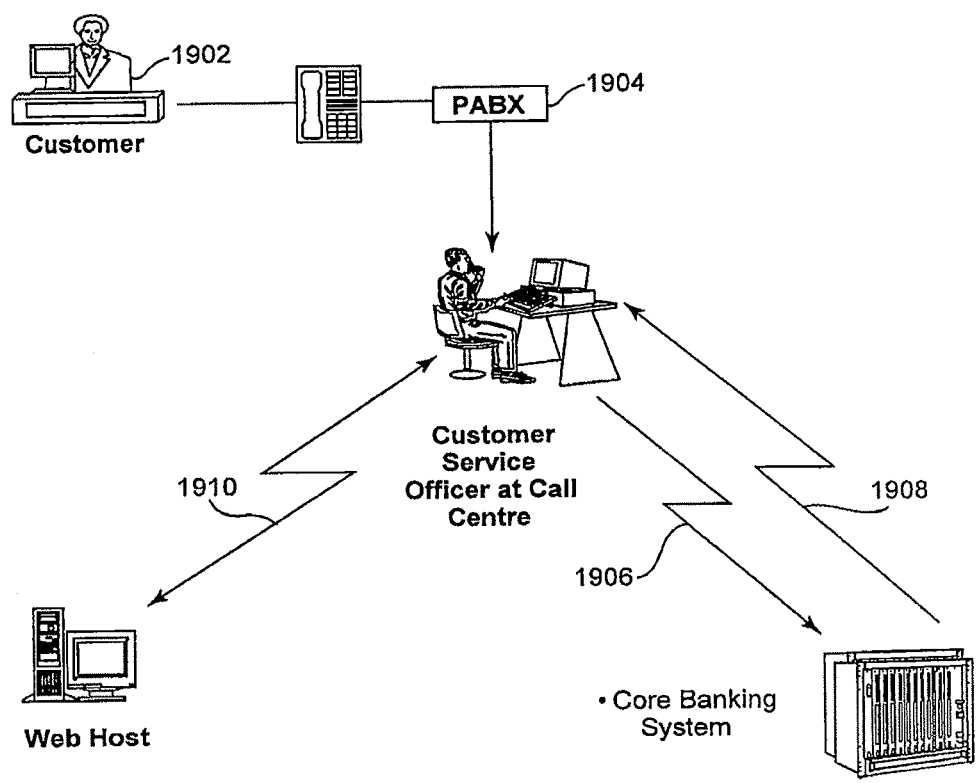
FIG. 19 is a schematic diagram of a customer authentication process in accordance with an embodiment of the present invention.

FIG. 19 is a schematic diagram of a customer authentication process 1900 in accordance with an embodiment of the present invention. In operation 1902, the customer calls a customer service number. A PABX routes the calls to a customer service officer in operation 1904. In operation 1906, the officer then authenticates the customer by confirming some personal details. Once the caller's identity has been confirmed, the customer service officer can assist the customer by providing required information or servicing specific request in operation 1908. If necessary, the customer service officer may look up the transactional history and other account information from the Web host in operation 1910.

Figure 20:
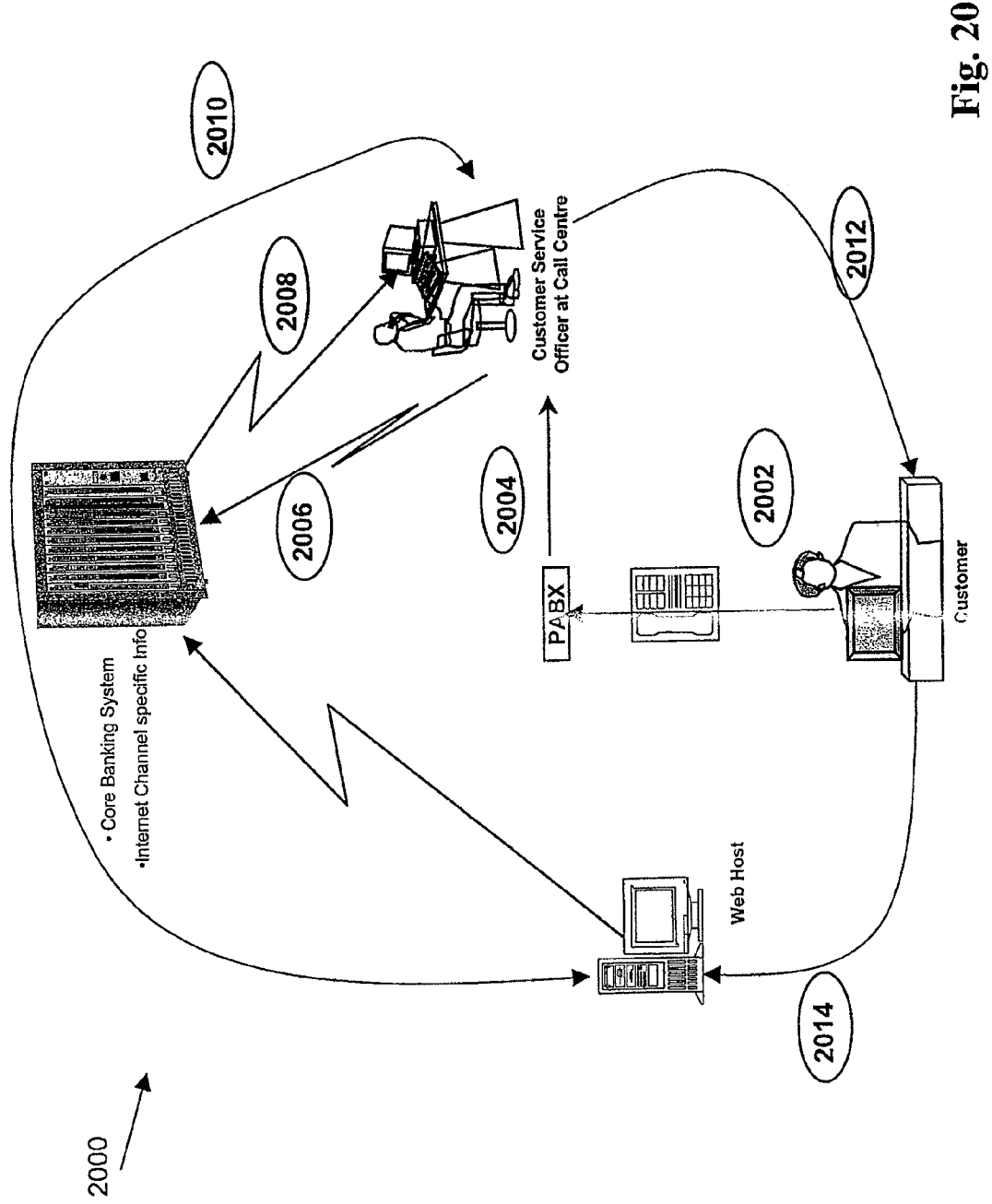
FIG. 20 is a schematic diagram of an account enquiry process in accordance with an embodiment of the present invention.

FIG. 20 is a schematic diagram of an account enquiry process 2000 in accordance with an embodiment of the present invention. In operation 2002, the customer initially calls the customer service number. The PABX routes the calls to the customer service officers in operation 2004. In operation 2006, the officer authenticates the customer by confirming some personal details. Once the caller's identity has been confirmed, the customer service officer may assist in providing required information or servicing specific request in operation 2008. If necessary, the customer service officer may need to lookup the transactional history and other account information from the Web host in operation 2010. The customer service officer communicates back to the customer once the request has been serviced in operation 2012. As another option, the customer can go directly to website and follow the instructions to enquiry about his account (see 2014).

Figure 21:
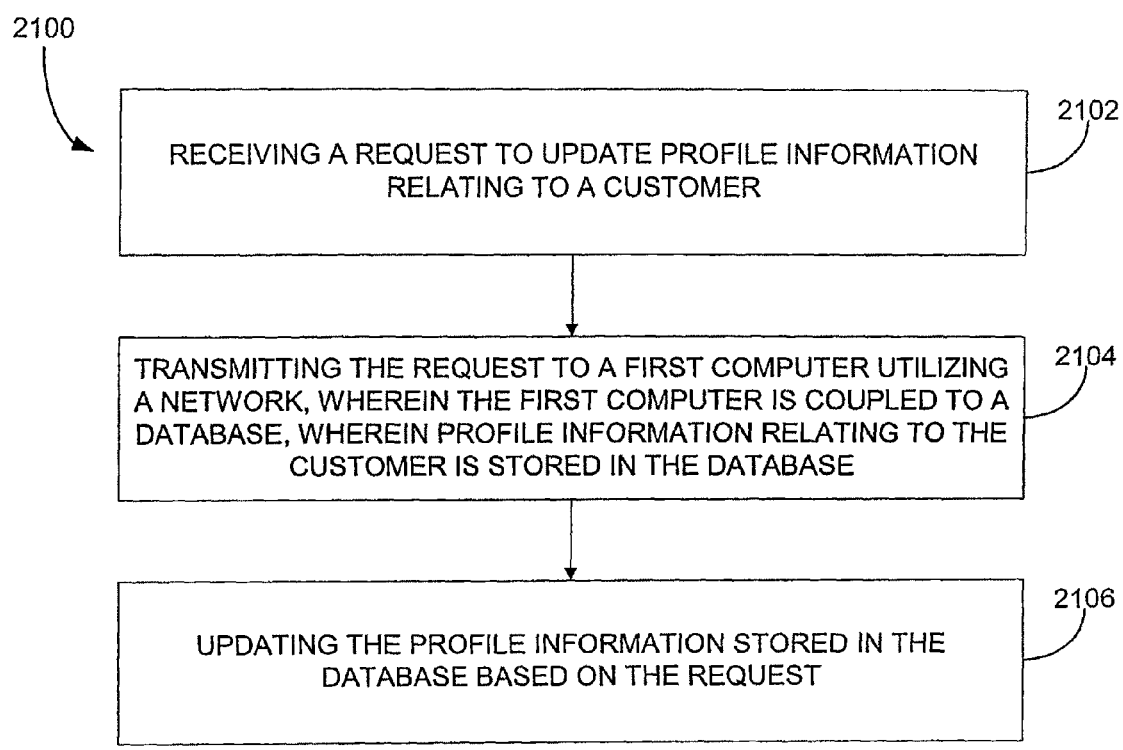
FIG. 21 illustrates a flowchart for a process for maintaining customer profile information utilizing a network.

FIG. 21 illustrates a flowchart for a process 2100 for maintaining customer profile information utilizing a network. A request to update profile information relating to a customer is received in operation 2102. The request is then transmitted to a first computer utilizing a network in operation 2104. The first computer is coupled to a database in which profile information relating to the customer is stored. The profile information stored in the database is updated based on the request in operation 2106.

In an aspect of the present invention, the request may be received from a customer. In such an aspect of the present invention, the identity of the customer may be authenticated prior to updating the profile information. In another aspect of the present invention, the request may be received from a business unit utilizing the network. In a further aspect of the present invention, the updating of the profile information stored in the database may further include updating the profile information stored in the database with one or more flags. As an option, the flags may be referenced in normal CBS processing utilizing the network.

In one embodiment of the present invention, a notification may be generated to confirm that the profile information has been updated. In such an embodiment of the present invention, the notification may then be to the customer utilizing the network.

Figure 22:
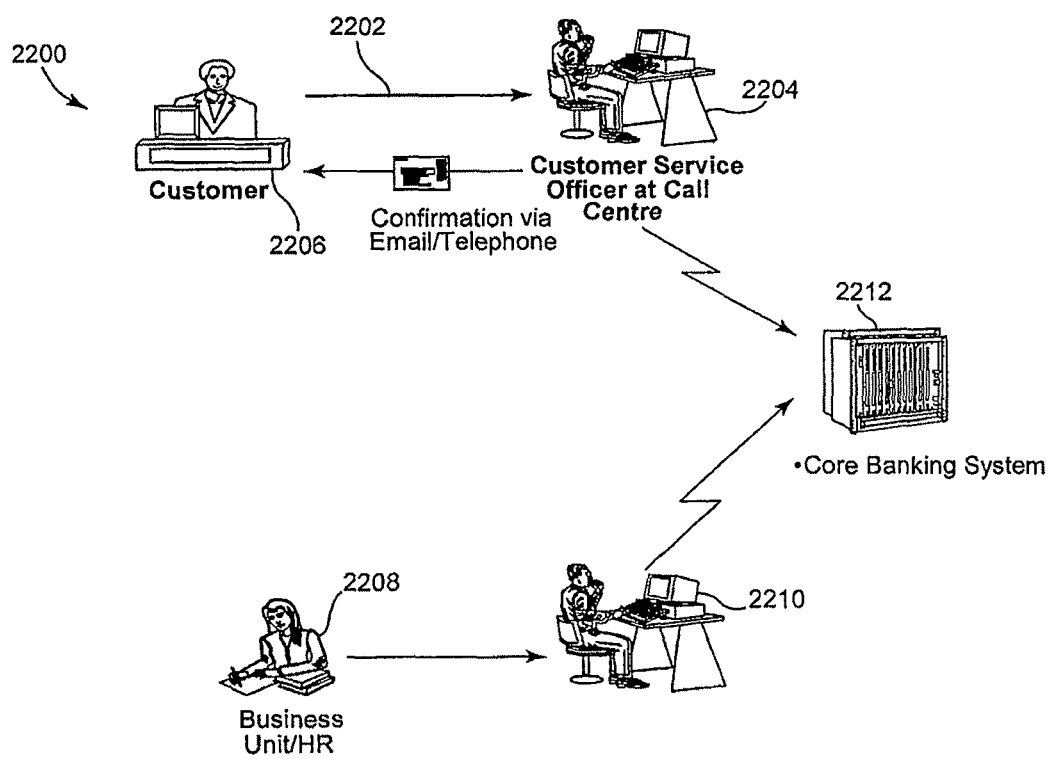
FIG. 22 is a schematic diagram of a CIF Maintenance process in accordance with an embodiment of the present invention.

FIG. 22 is a schematic diagram of a CIF Maintenance process 2200 in accordance with an embodiment of the present invention. In operation 2202, the customer service officer performs customer authentication (see customer Authentication Process Flow). In operation 2204, the customer service officer performs online update of selected information (e.g. change of address/email, phone number, etc) per customer request. In operation 2206, a confirmation of change may be sent to customer via email or telephone. As another option, business units may inform the Account/CIF Maintenance Group (ACM) of the new status of customers for updates in operation 2208. For example, Human Resources might forward information regarding new employees to ACM. In such a situation, the ACM updates new employee's CIF with a Staff Flag in operation 2210. Updated CIF status, tags, etc, in CBS may then be referenced in the normal CBS processing (e.g. interest calculation will take into account staff interest rates, etc) in operation 2212.

Figure 23:
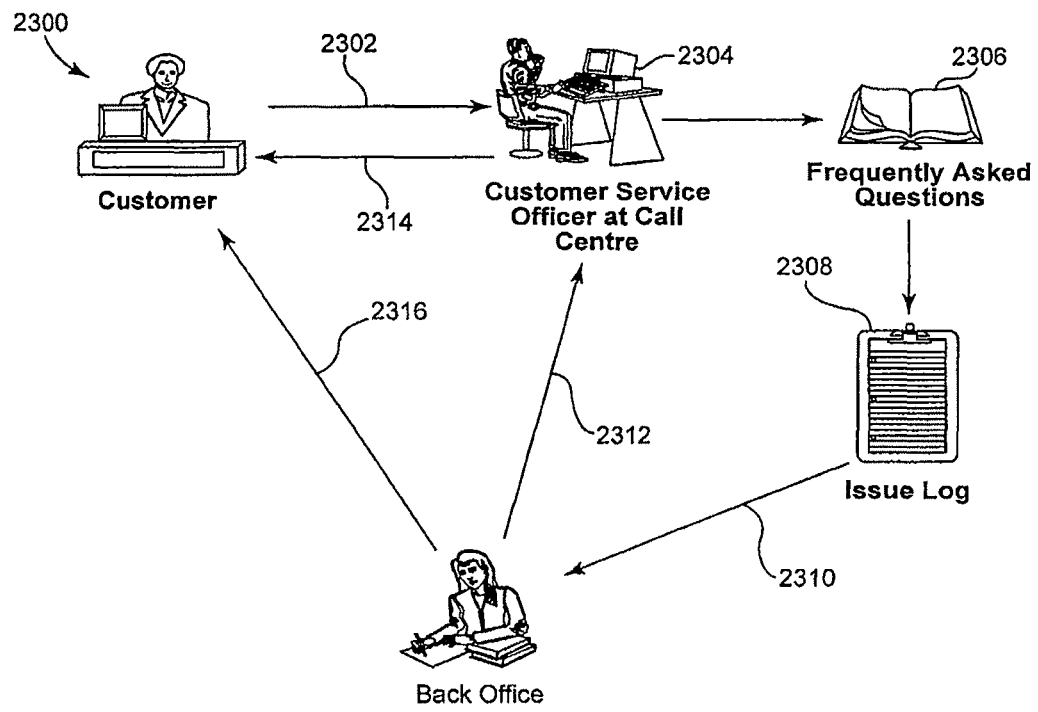
FIG. 23 is a schematic diagram of an issue resolution and customer feedback process in accordance with an embodiment of the present invention.

FIG. 23 is a schematic diagram of an issue resolution and customer feedback process 2300 in accordance with an embodiment of the present invention. In operation 2302, the customer service officer performs customer authentication (see customer Authentication Process Flow). In operation 2304, the customer service officer takes down customer problem/question. In operation 2306, the customer service officer may refer to list of Frequently Asked Questions (FAQ) for the resolution to problem. In operation 2308, the problem may be escalated to the Issue Log. The Issue Log is routed to the appropriate Back Office (i.e. IT to IT-related problems, etc) in operation 2310. In operation 2312, back office personnel may then inform the customer service officer of the resolution to problem. The customer service officer can then contact customer and inform him of the resolution to his problem in operation 2314. As another option, the back office personnel can contact the customer directly and work with him to resolve the problem in operation 2316. In such an option, the customer service officer can still inform the customer of the solution/resolution of the problem (see 2314).

Figure 24:
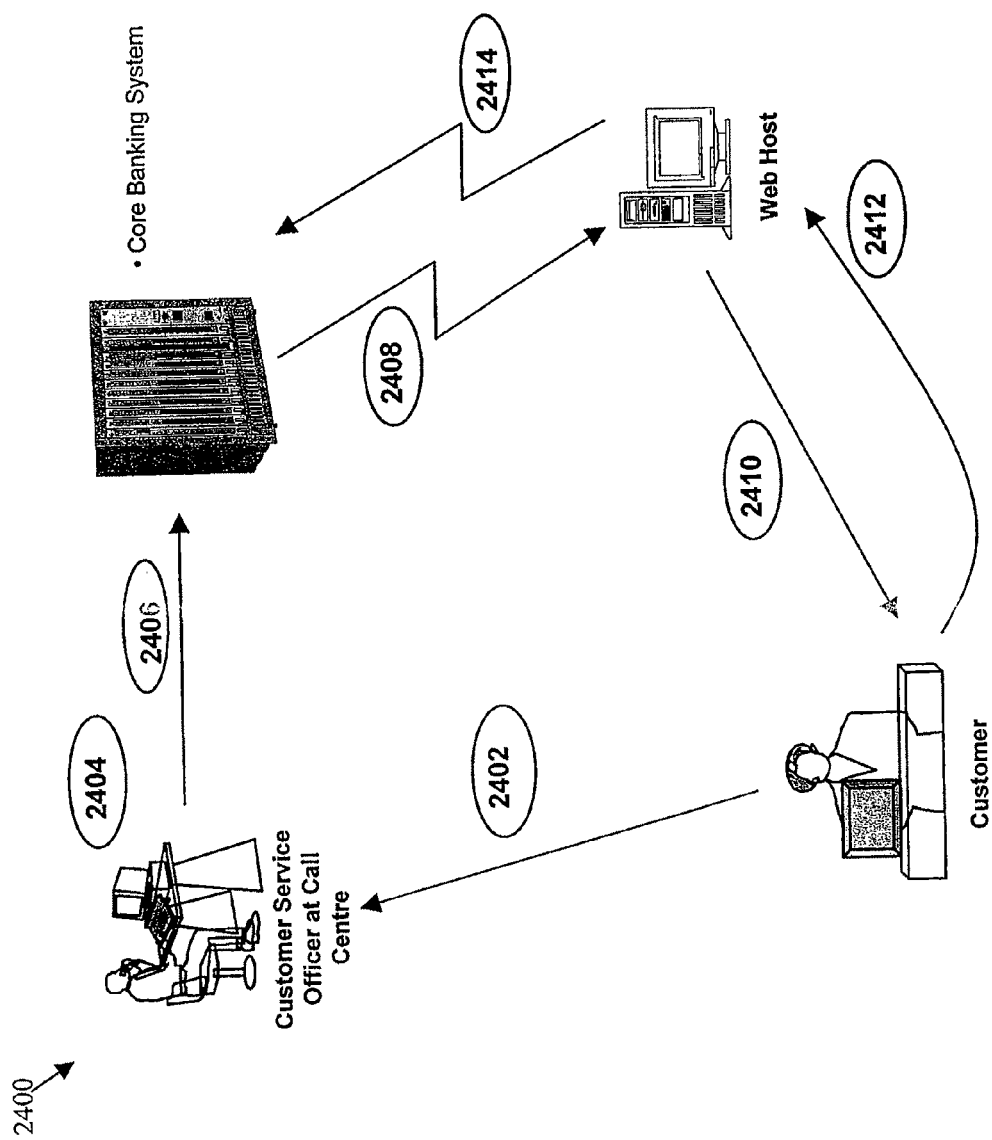
FIG. 24 is a schematic diagram of a Funds Transfer process in accordance with an embodiment of the present invention.

FIG. 24 is a schematic diagram of a Funds Transfer process 2400 in accordance with an embodiment of the present invention. In operation 2402, a customer service officer performs customer authentication (see customer Authentication Process Flow) In operation 2404, the customer service officer performs customer authentication (see customer Authentication Process Flow) In operation 2406, the customer service officer enters the Funds Transfer request in the Core Banking System. In operation 2408, a customer account is updated with transactions from the Core Banking System from the nightly batch synchronization between the web host and the Core Banking System. In operation 2410, the customer can now view the funds transfer transaction from the web. As another option, the customer can perform funds transfer transactions through the Internet (see operation 2412). In operation 2414, the funds transfer request is executed in the Core Banking System.

Figure 25:
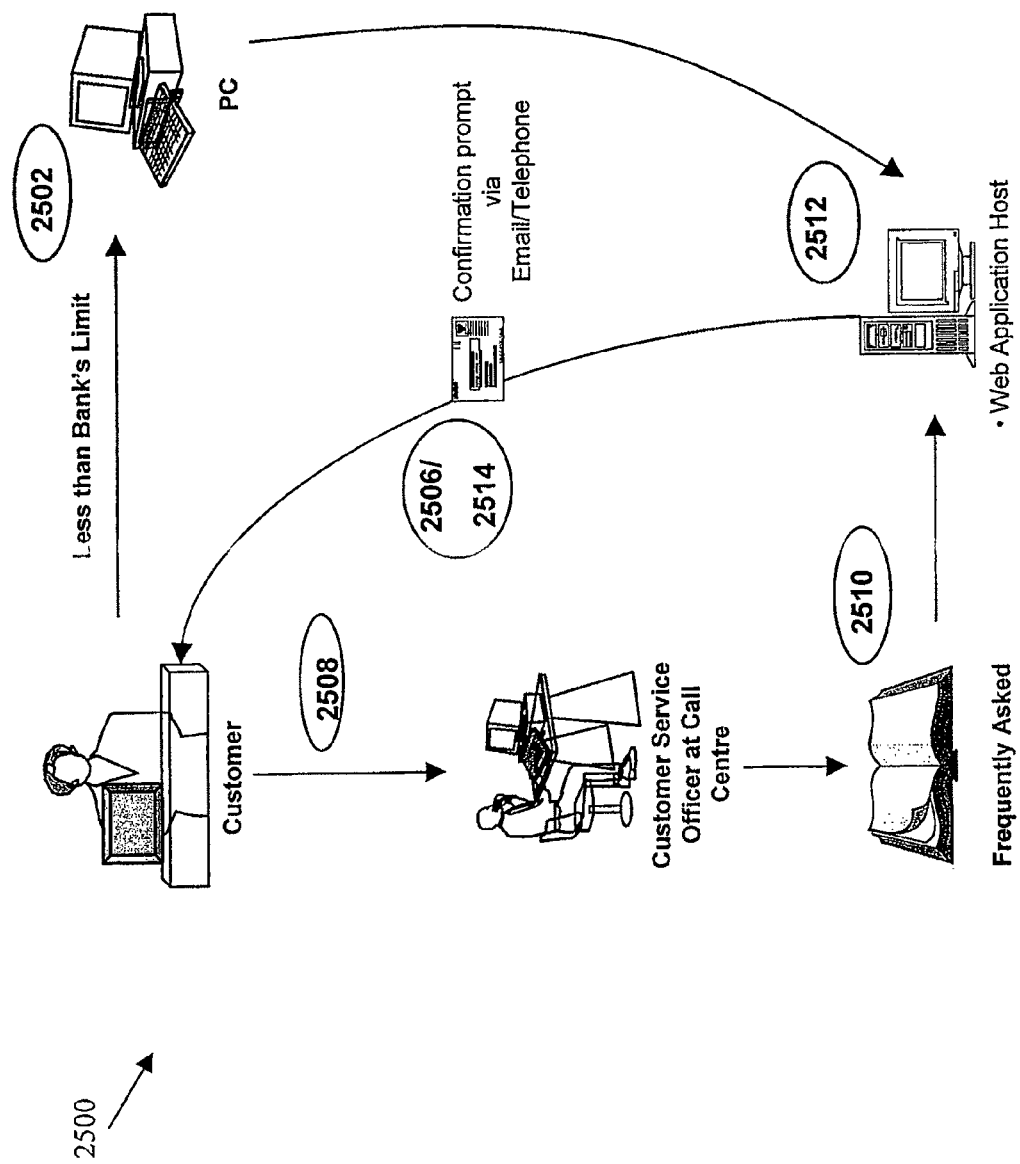
FIG. 25 is a schematic diagram of a financial transaction limit charge process in accordance with an embodiment of the present invention.

FIG. 25 is a schematic diagram of a financial transaction limit charge process 2500 in accordance with an embodiment of the present invention. In operation 2502, the bank may have a limit on all financial transactions. If a customer wanted to change his limit (although still within the bank's limit), he is able to complete the transaction through the website. In operation 2504, the web application host is updated with the new limit. In operation 2506, online confirmation of the limit change is displayed to the customer. As another option, if the customer would like to change his limit to be greater than the bank's limit, then in operation 2508 he may be able to do so through the Call Center. The customer service officer performs customer authentication (see customer authentication process flow). In operation 2510, the customer service officer may refer to a Frequently Asked Questions list or obtain his supervisor's authorization (based on policies and guidelines specified) In operation 2512, the web application host is updated with the new limit. The customer is then informed of the change in limit in operation 2514.

Figure 26:
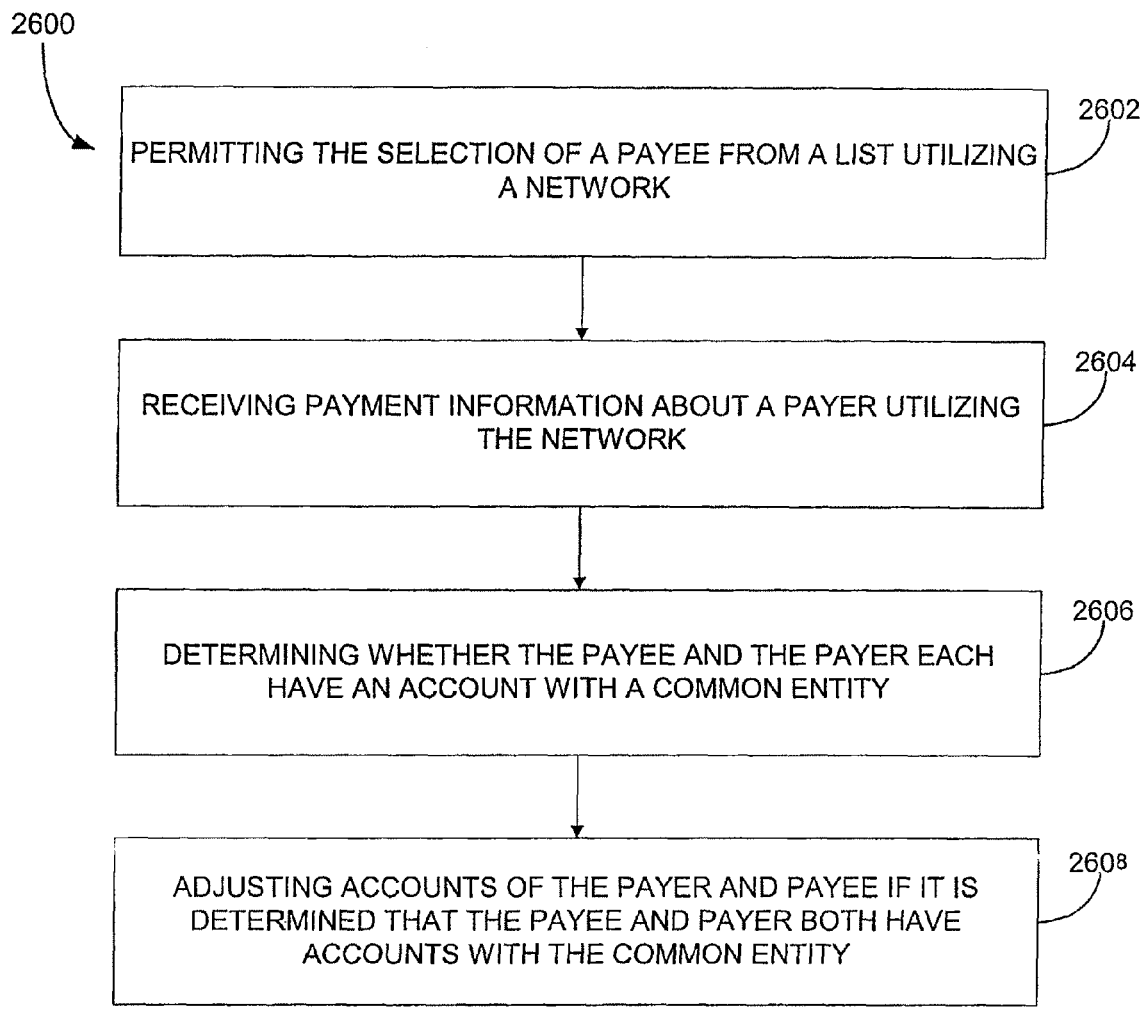
FIG. 26 illustrates a flowchart for a process for performing third party payments utilizing a network in accordance with an embodiment of the present invention.

FIG. 26 illustrates a flowchart for a process 2600 for performing third party payments utilizing a network. The selection of a payee from a list of payees is permitted utilizing a network in operation 2602. Payment information about a payer is also received utilizing the network in operation 2606. A determination is made in operation 2608 as to whether the payee and the payer each have an account with a common entity. If it is determined that the payee and payer both have accounts with the common entity, then accounts of the payer and payee are adjusted in operation 2608.

In one embodiment of the present invention, the network may be utilized to adjust accounts of the payer and payee via a clearing house if it is determined that the either payee and payer do not have accounts with the common entity. As an option in such an embodiment of the present invention, a record made be stored of the adjustment of the account of payee. In another embodiment of the present invention, the adding of an additional payee to the list of payees may be permitted if the additional payee is not on the list of payees. In such an embodiment of the present invention, information relating to the additional payee may be received and storied in a database.

In an aspect of the present invention, the payment information may include: information as to whether the payment is a one-time payment or a recurring payment, account number information, bill number information, and/or transmission date information.

Figure 27:
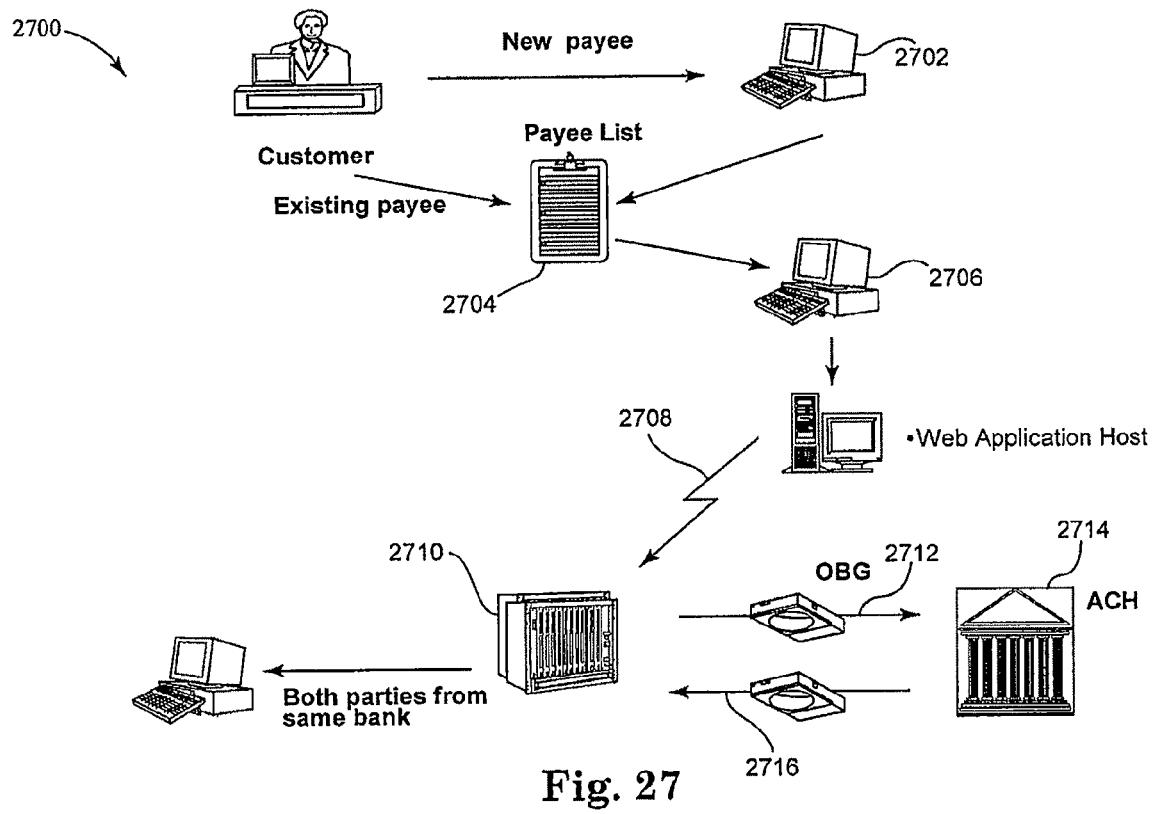
FIG. 27 is a schematic diagram of a third party payments process in accordance with an embodiment of the present invention.

FIG. 27 is a schematic diagram of a third party payments process 2700 in accordance with an embodiment of the present invention. If the payee does not exist in the current payee list, then in operation 2702, the new payee is created by entering the relevant information about the payee. (e.g., payee name, account number, bill id number, etc). Public payees that have accounts with the bank may be available by default. Otherwise, private payees' information will have to be created. In operation 2704, the payee is selected from a list of payees (payee information was either already existent or was created in operation 2702) In operation 2706, payment information (single/recurring, account number, bill number, transmission date, etc) is then completed. The Core Banking System is then updated in operation 2708, in nightly batch runs for example. In operation 2710, if both the payee and payer's accounts reside in the same bank, the relevant accounts are debited or credited. As another option, if the recipient party resides in another bank, a credit entry is added to an OBG tape in operation 2712. In such a situation, payment is cleared overnight by the Automated Clearing House (ACH) in operation 2714 and an IBG tape is generated. Transfers for receiving party and rejected transactions from the OBG (comes back as Outward Returns) may come in through the IBG tape in operation 2716.

Figure 28:
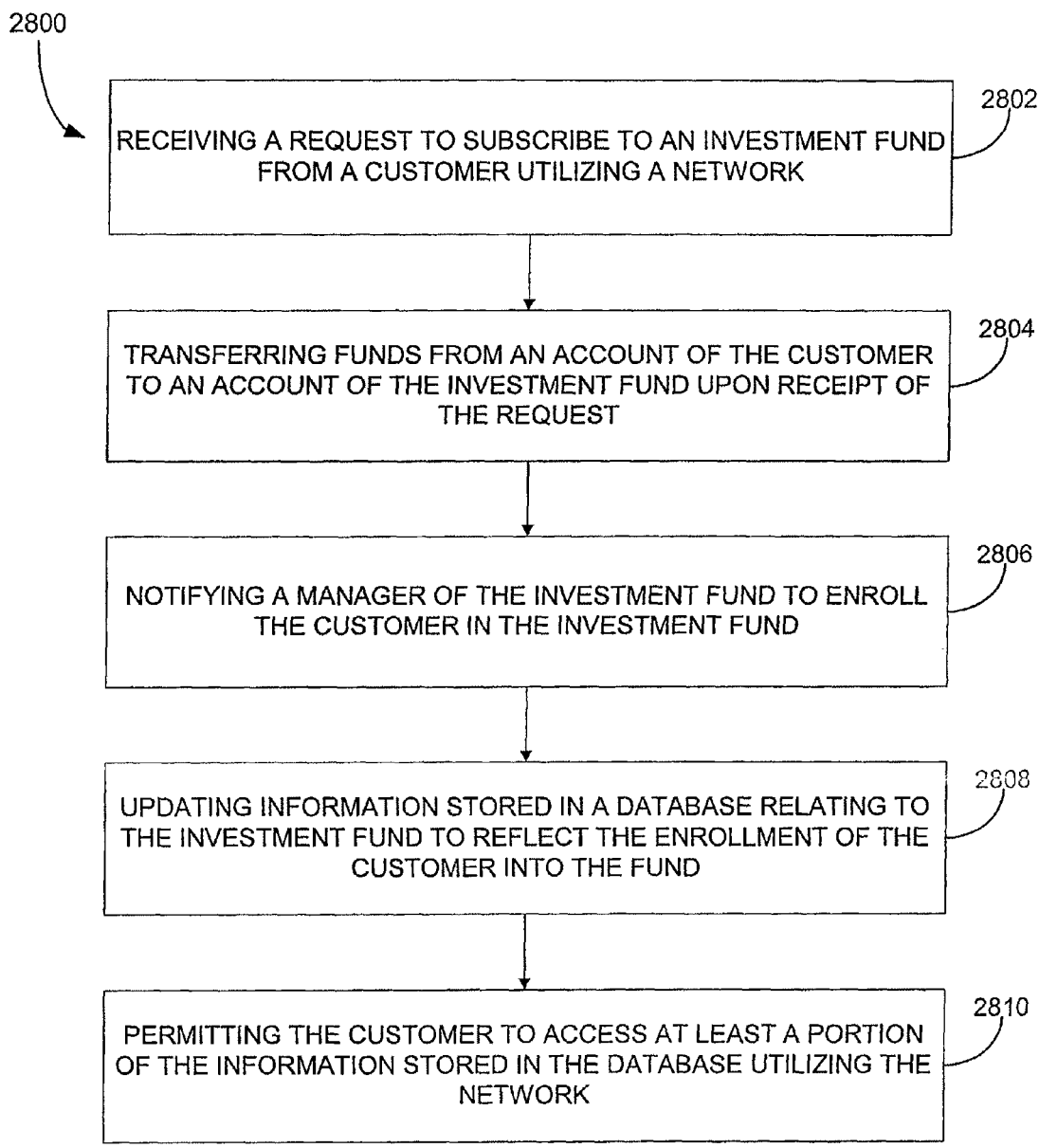
FIG. 28 illustrates a flowchart for a process for unit trust subscriptions and redemptions in an online banking model in accordance with an embodiment of the present invention.

FIG. 28 illustrates a flowchart for a process 2800 for unit trust subscriptions and redemptions in an online banking model. A request to subscribe to an investment fund is received from a customer utilizing a network in operation 2802. Upon receipt of the request, funds (i.e., money) are then transferred from an account of the customer to an account of the investment fund in operation 2804. A manager of the investment fund is then notified in operation 2806 to enroll the customer in the investment fund. Information stored in a database relating to the investment fund is updated to reflect the enrollment of the customer into the fund in operation 2808. Subsequently, the customer is permitted to access at least some of the information stored in the database utilizing the network in operation 2810.

In an embodiment of the present invention, a request to redeem funds may be received from the customer utilizing the network. The manager of the investment fund is notified of the request. The information stored in the database relating to the investment fund is updated to reflect the redemption of funds by the customer. Funds are also transferred from the account of the investment fund to the account of the customer. As an option in such an embodiment of the present invention, the transferring of funds from the account of the investment fund to the account of the customer may occur four or more business days after the date of the receipt of the request to redeem funds.

In another embodiment of the present invention, funds may be transferred from the account of the customer to the account of the investment fund via an intermediate account. In a further embodiment of the present invention, the network may also be utilized to permit the customer to verify a price for subscribing to the investment fund.

In yet another embodiment of the present invention, the request to subscribe from the customer may be consolidated with at least one additional request to subscribe to the investment fund. In one aspect of the present invention, notifying the manager of the investment fund to enroll the customer in the investment fund may occurs one or more business day after the receipt of the request to subscribe to the investment fund.

Figure 29:
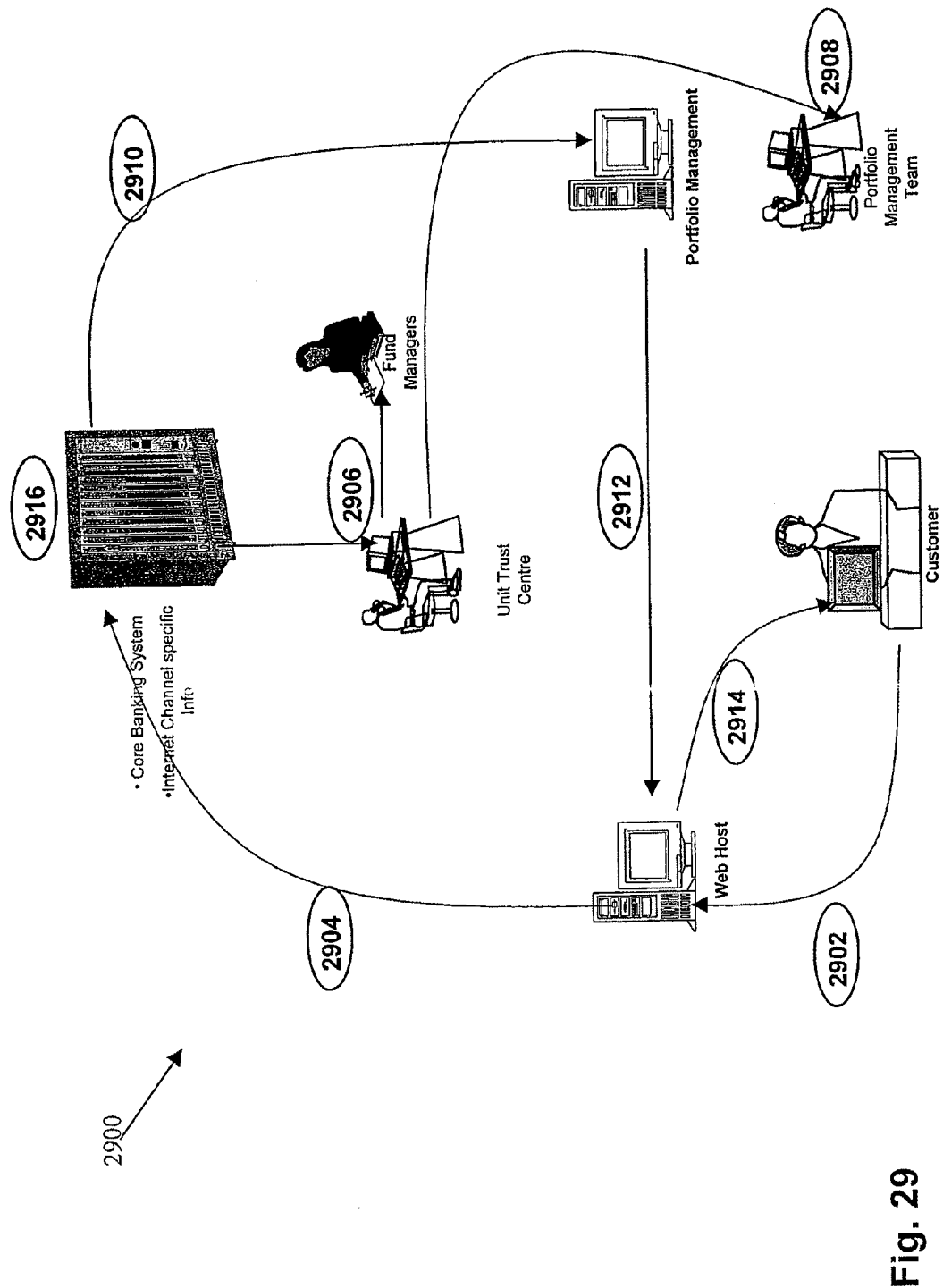
FIG. 29 is a schematic diagram of a Unit Trust Subscription process in accordance with an embodiment of the present invention.

FIG. 29 is a schematic diagram of a Unit Trust Subscription process 2900 in accordance with an embodiment of the present invention. In operation 2902, the customer enters a Unit Trust Subscription order (in dollars for example) into the Web page after verifying the indicative prices of the Unit Trust Funds. In operation In operation 2904, a Unit Trust Subscription triggers transfer of funds from the customer accounts to the UTC Sundry Account and generate appropriate GL entries. The Unit Trust Center officers then place consolidated fund investment orders with fund managers by faxing them a consolidated (net) buy/sell for each fund in operation 2906. The following day, Unit Trust Center officers obtain the transacted price of the previous day's trade in operation 2908. The portfolio management team is forwarded this information, which is then updated with in its system. In operation 2910, a Portfolio Management system is updated with the latest order information. In operation 2912, the Web Host is updated with customer's latest positions from the Portfolio Management System. In operation 2914, the Unit Trust investment portfolio can now be viewed by the customer. In operation 2914, on a regular basis (once or twice a week depending on the fund), the funds may be credited into the Fund Manager's account as settlement.

Figure 30:
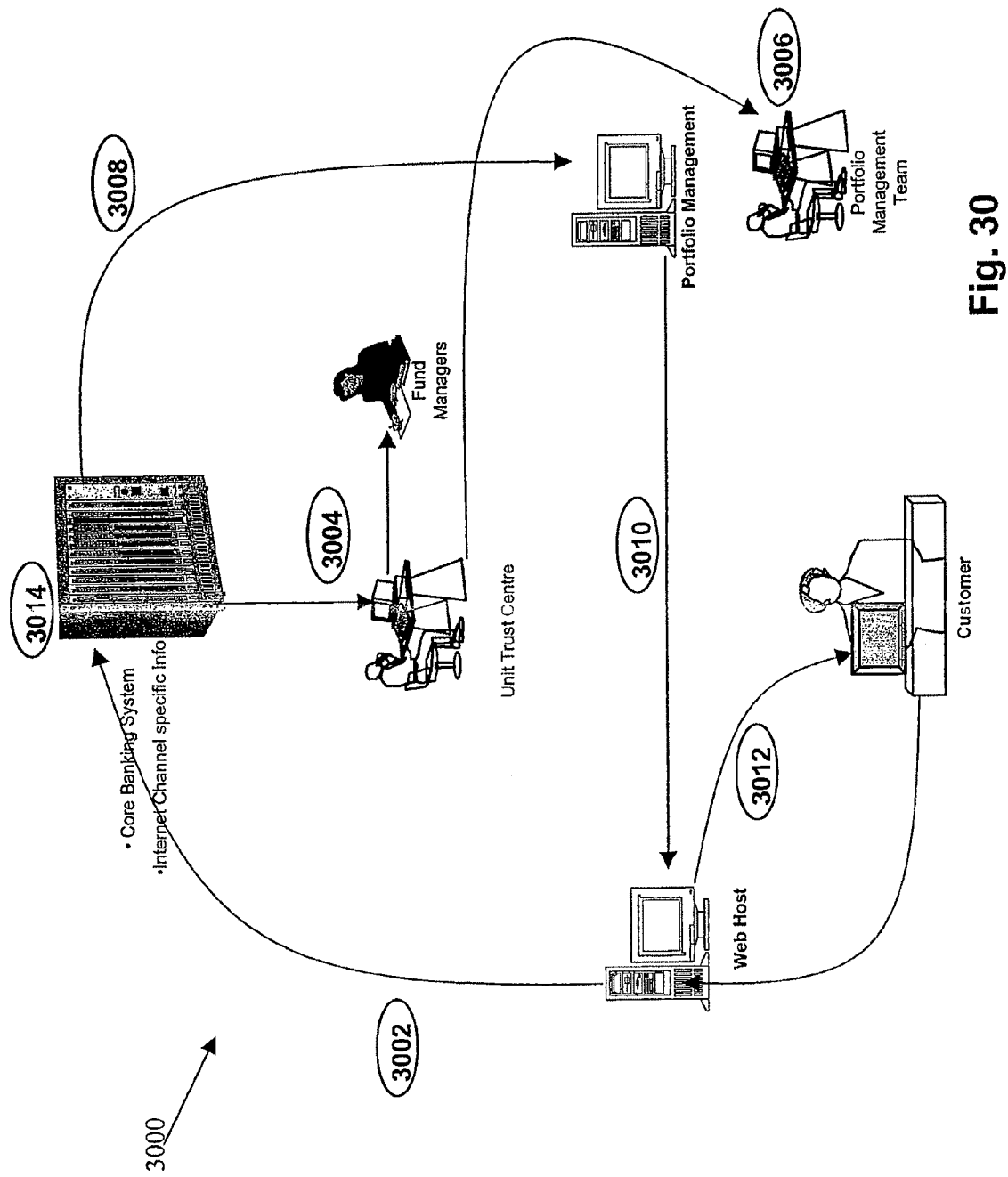
FIG. 30 is a schematic diagram of a Unit Trust redemption process in accordance with an embodiment of the present invention.

FIG. 30 is a schematic diagram of a Unit Trust redemption process 3000 in accordance with an embodiment of the present invention. In operation 3002, the customer enters a Unit Trust redemption order (in units) into Web page after verifying the indicative prices of the Unit Trust Funds. In operation 3004, Unit Trust Center officers then place consolidated fund investment orders with fund managers by faxing them a consolidated (net) buy/sell for each fund. The following day, Unit Trust Center officers obtain the transacted price of the previous day's trade and the portfolio management team is forwarded this information, which is then updated with in its system in operation 3006. In operation 3008, the portfolio management system may be updated with the latest order information. In operation 3010, the Web Host may be updated with customer's latest positions from the Portfolio Management System. In operation 3012, the Unit Trust investment portfolio then now be viewed by customer. In one embodiment of the present invention, At T+4 (4 days after the order was executed), the Unit Trust redemption triggers a transfer of funds from Fund Manager's accounts to the UTC Sundry Account, and subsequently, at T+6, the funds are credited to customer's accounts in operation 3014.

Figure 31:
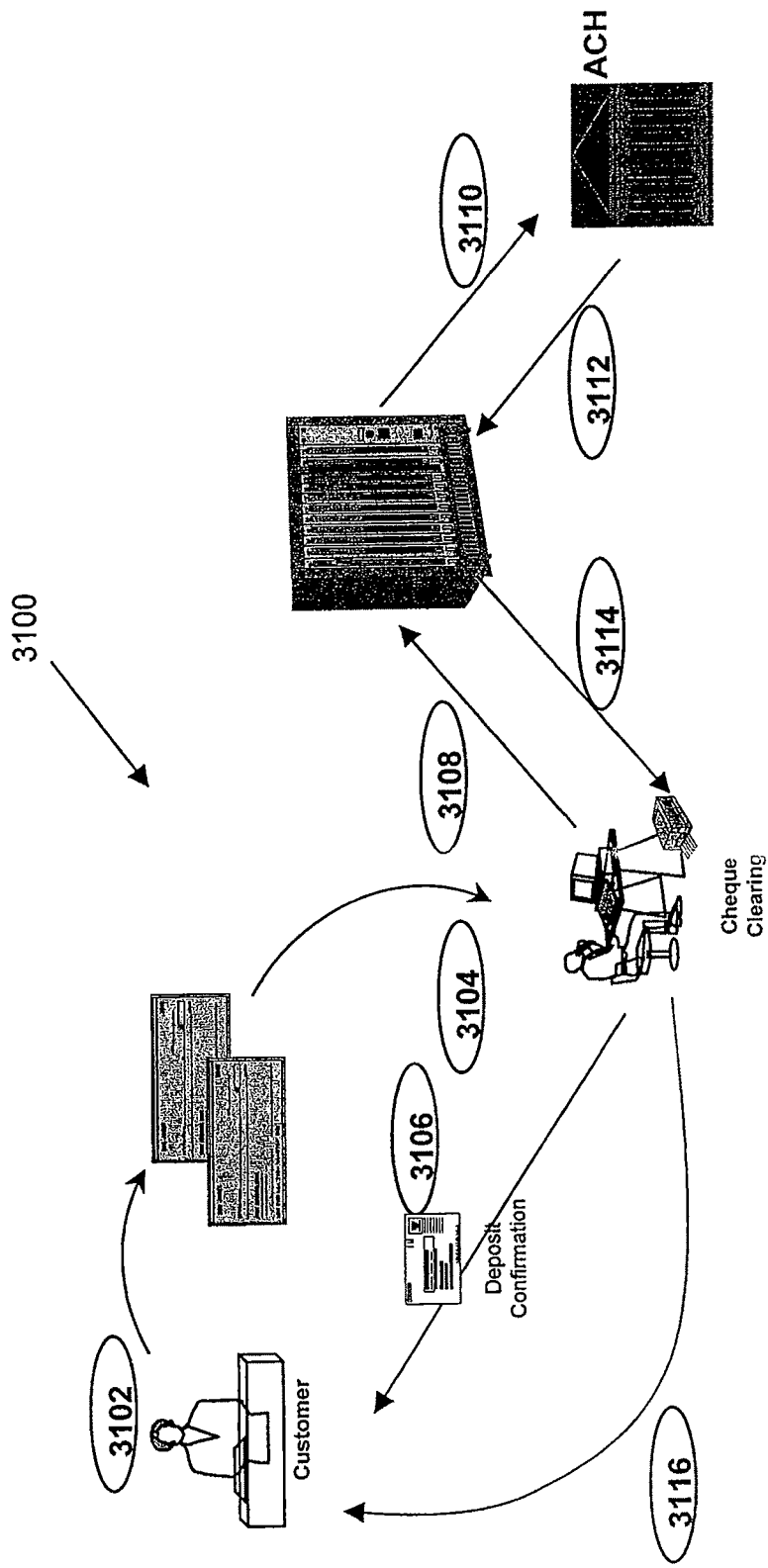
FIG. 31 is a schematic diagram of a check deposits process in accordance with an embodiment of the present invention.

FIG. 31 is a schematic diagram of a check deposits process 3100 in accordance with an embodiment of the present invention. In operation 3102, a customer deposits a check into Direct Banking account. In operation 3104, the Check is processed by the Check Clearing Officer. A deposit confirmation is sent to the customer upon receipt of the check to be deposited in operation 3106. The Officer updates balance in customer account in operation 3108, however, funds may not be available until check has cleared. In operation 3110, the checks are sent to the clearing house (ACH) for overnight clearing. In operation 3112, the ACH provides tapes for the Core Banking System to process when there are check returns. In operation 3114, the Check Clearing Officer is notified of the check return the following day. In operation 3116, the Check Clearing Officer then follows procedures in notifying customer and obtain further instructions.

Figure 32:
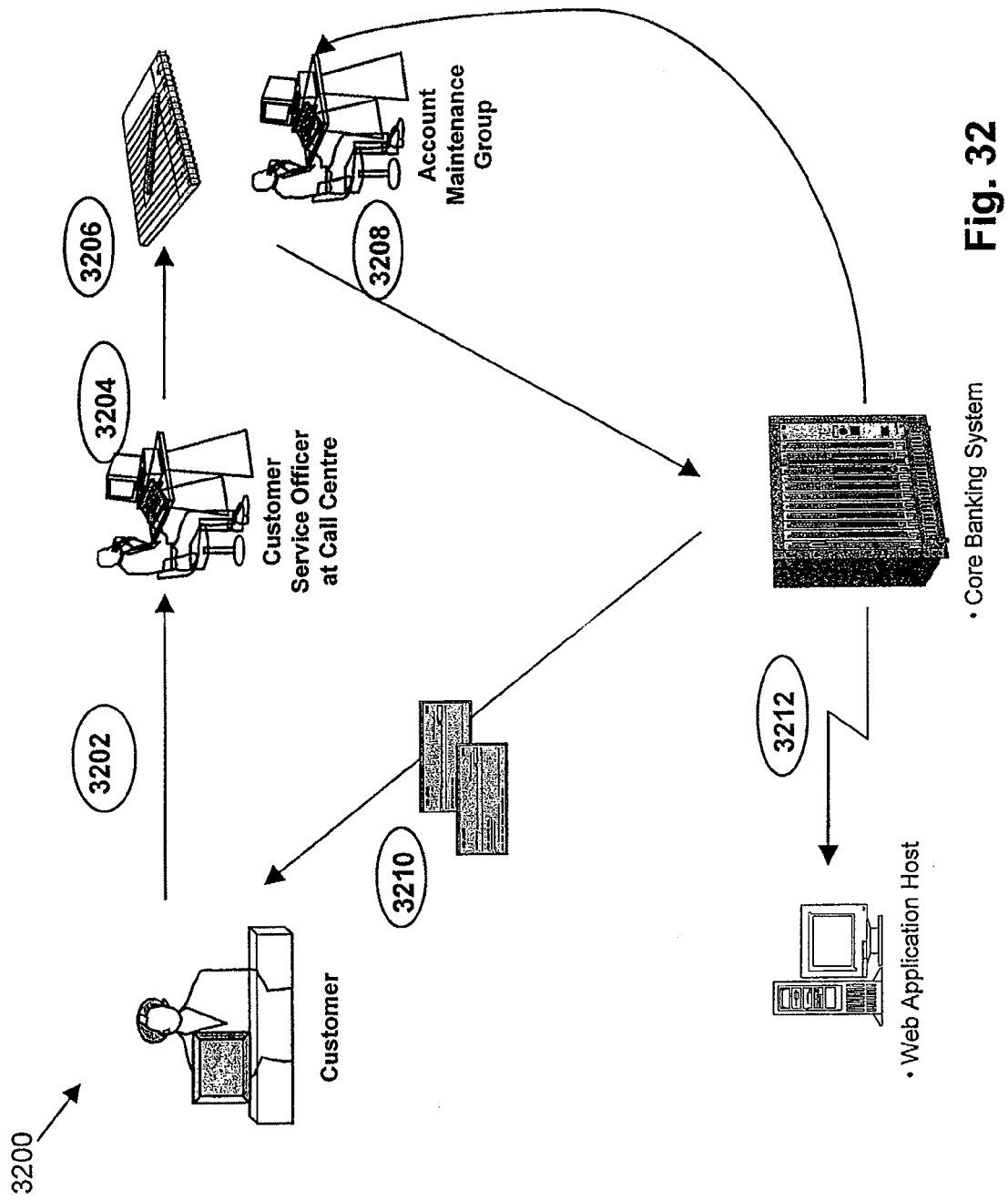
FIG. 32 is a schematic diagram of an account closure process in accordance with an embodiment of the present invention.

FIG. 32 is a schematic diagram of an account closure process 3200 in accordance with an embodiment of the present invention. In operation 3202, a customer service officer performs customer authentication (see customer authentication process flow). In operation 3204, the customer service officer fills out closure instructions with all the relevant information (reason, method of paying out remaining balance, etc). In operation 3206, payment instructions are sent to central operations AMG. In operation 3208, AGM officers execute payment instructions, through a funds transfer (refer to funds transfer process flow) or a Cashiers Order. Final processing of interest crediting, statementing, charges, etc, may be executed by batch. In operation 3210, the Cashiers Order is forwarded to the customer. In operation 3212, the Web Application host is then updated with information about the accounts that have been closed. If the customer is closing his last active account, user ID may also then be disabled.

Figure 33:
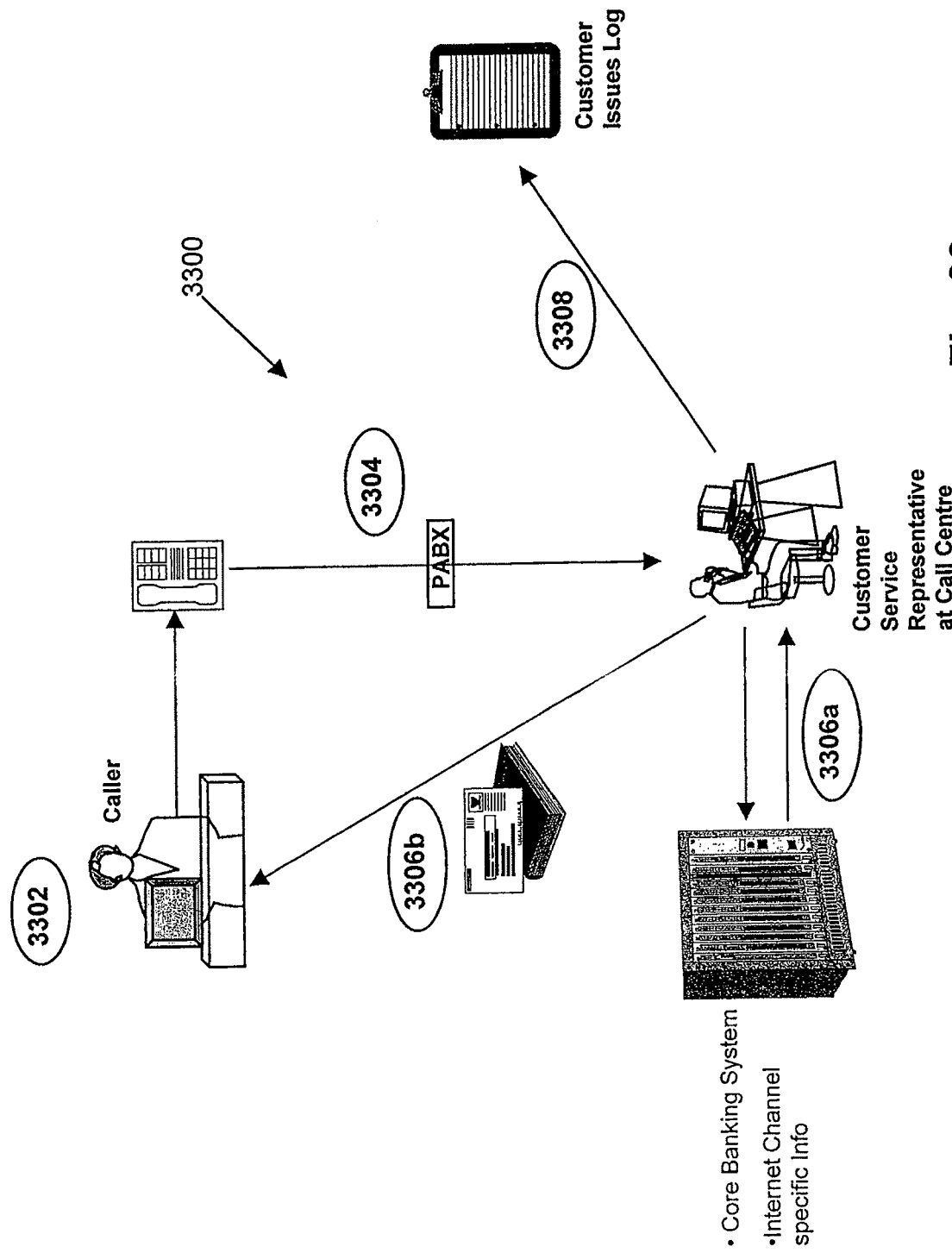
FIG. 33 is a schematic diagram of a product inquiry process in accordance with an embodiment of the present invention.

FIG. 33 is a schematic diagram of a Product Inquiry process 3300 in accordance with an embodiment of the present invention. In operation 3302, a caller calls the customer service number. In operation 3304, a PABX routes the calls to a customer service officer. By referring to the Internet Front End system, the customer service officer is able to assist by: answering navigational and other usability type questions (operation 3306*a*), and sending requested brochures, UT information and prospectus via mail to callers (operation 3306*b*). In operation 3308, all calls may be logged in the Customer Issues System (please refer to customer issues logging process flow).

Figure 34:
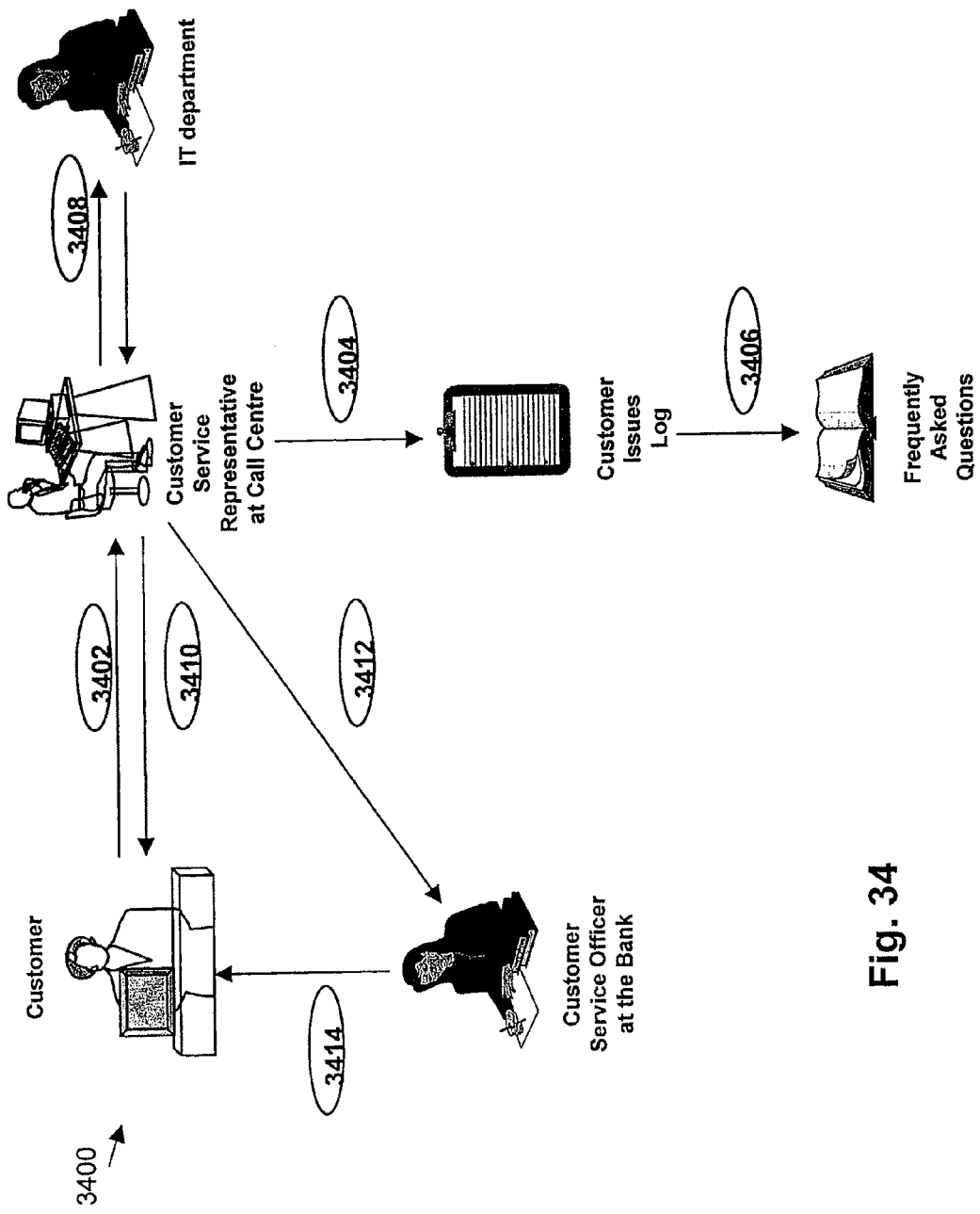
FIG. 34 is a schematic diagram of a customer issues logging process in accordance with an embodiment of the present invention.

FIG. 34 is a schematic diagram of a customer Issues Logging process 3400 in accordance with an embodiment of the present invention. In operation 3402, a customer calls the customer service number. In operation 3404, the customer service representative logs the specific details of the problems and requests received. In operation 3406, the customer service representative resolves the problems by referring to the Frequently Asked Questions (FAQ). In operation 3408, if the nature of the problem is technical, the CSR may need to consult the IT department. In operation 3410, the CSR then informs the customer of the resolution of the problem. In operation 3412, if the CSR is unable to resolve the problem/request (e.g. queries about account balance etc.) the call may then be transferred to the CSR at the Bank. In such a situation, the CSR at the Bank then informs customer of the resolution to the problem in operation 3414.

Figure 35:
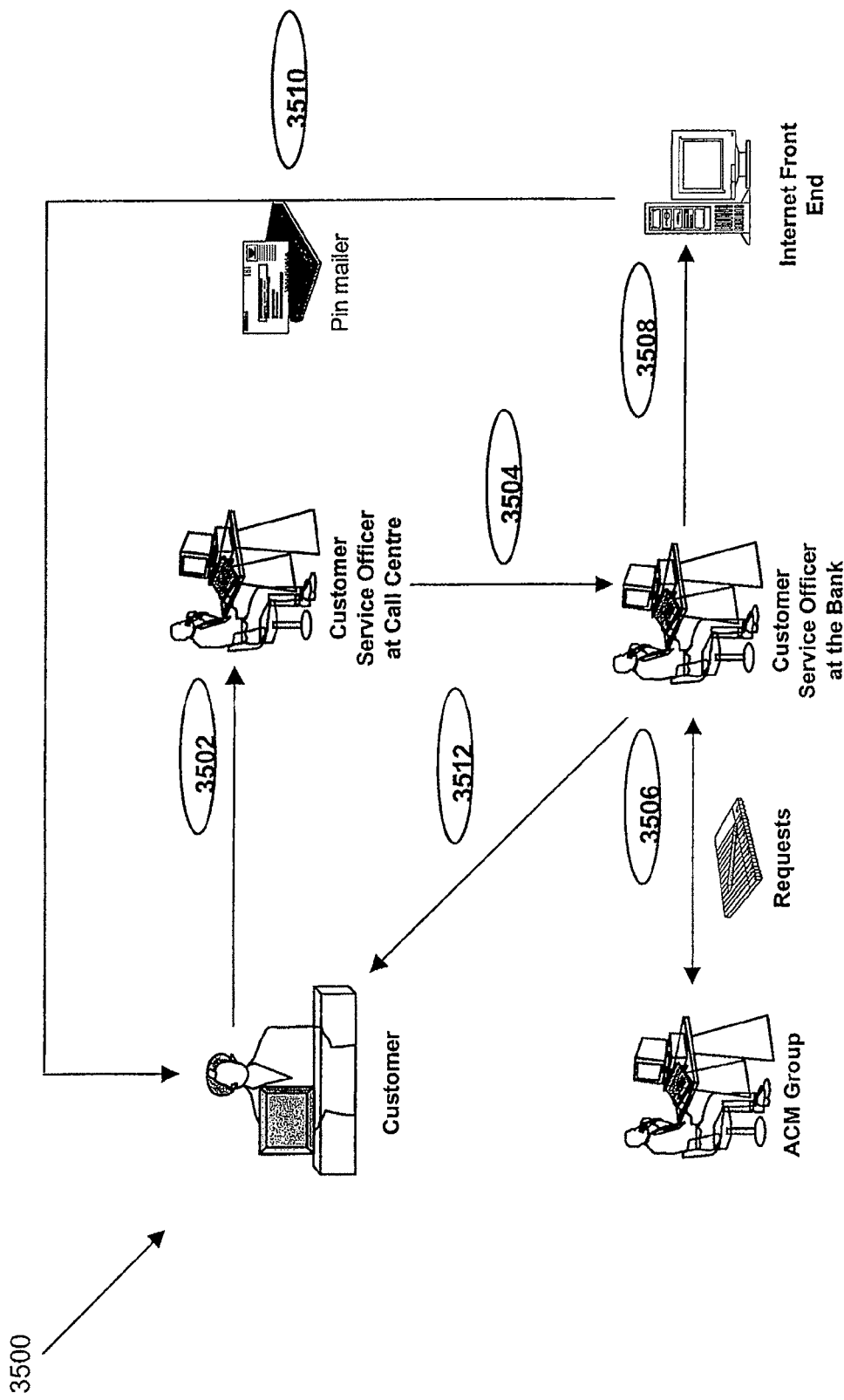
FIG. 35 is a schematic diagram of an account maintenance request process in accordance with an embodiment of the present invention.

FIG. 35 is a schematic diagram of an account maintenance request process 3500 in accordance with an embodiment of the present invention. In operation 3502, a customer calls the customer service number with requests to: Add/Remove Account Holder, Account Tag/Status Change, Account Reactivation, and/or Password Reset. In operation 3504, the CSR at the Call Center transfers the call to the CSR at the bank. In operation 3506, the CSR at Bank sends requests to the ACM group for verification before making changes to accounts in CBS. In operation 3508, if the request is password reset, the CSR at the Bank then performs the changes in the CSR screen of the Internet Front End. In operation 3510, the new personal identification number (PIN) is mailed to the customer. In operation 3512, the CSR at the Bank then informs the customer of the change status.

In accordance with an embodiment of the present invention, an online banking model may also include a risk profiler and asset allocation tool module. The Risk Profiler allows everyone to answer a set of questions to help determine their risk profile and display a recommended asset allocation mix. For registered user and customers, this asset mix may be saved and displayed on a web page. A user can then go further by providing their personal financial data to generate a graphical representation of their current asset mix to compare with the recommended asset allocation mix.

Figure 36:
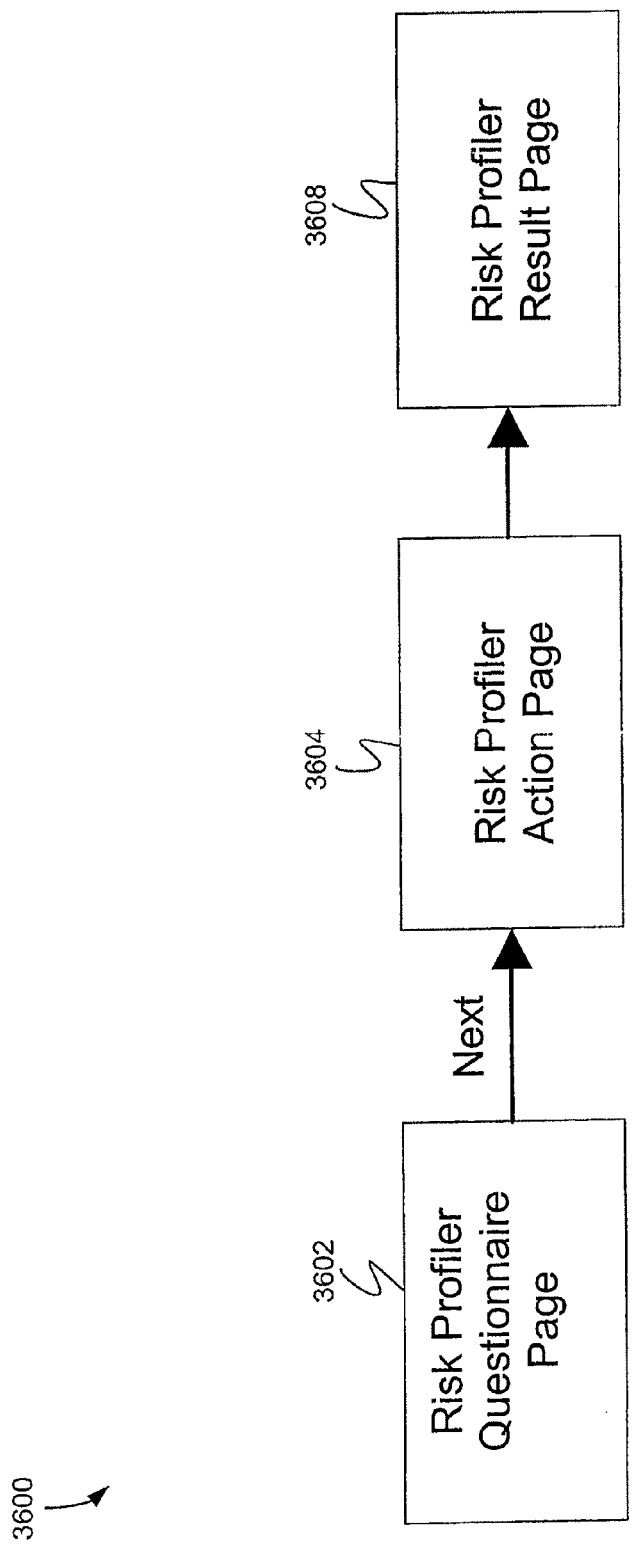
FIG. 36 illustrates a flowchart for risk profiler page process in accordance with an embodiment of the present invention.

FIG. 36 illustrates a flowchart for risk profiler page process 3600 in accordance with an embodiment of the present invention. A risk profiler questionnaire page 3602 is first displayed. The risk profiler questionnaire page displays a list of questions (all may be compulsory) for the user to answer. After the questions have been answered, the answers are submitted to be processed by a risk profiler action page 3604. After processing, the risk profiler action page then loads an appropriate risk profiler result page 3606.

FIG. 37 is a schematic illustration of an exemplary risk profiler questionnaire page 3602 in accordance with an embodiment of the present invention. The risk profiler questionnaire page displays a plurality of questions 3702 in a list (all may be compulsory) for the user to answer. In one embodiment of the present invention, the list of questions comprises 5 questions. The risk profiler questions capture data needed to determine the risk profile. The risk profiler questionnaire page may contain selection boxes 3704 to capture information. The user clicks a Submit Button 3706 after answering to send the answers to be processed by the risk profiler action page 3604.

Figure 38:
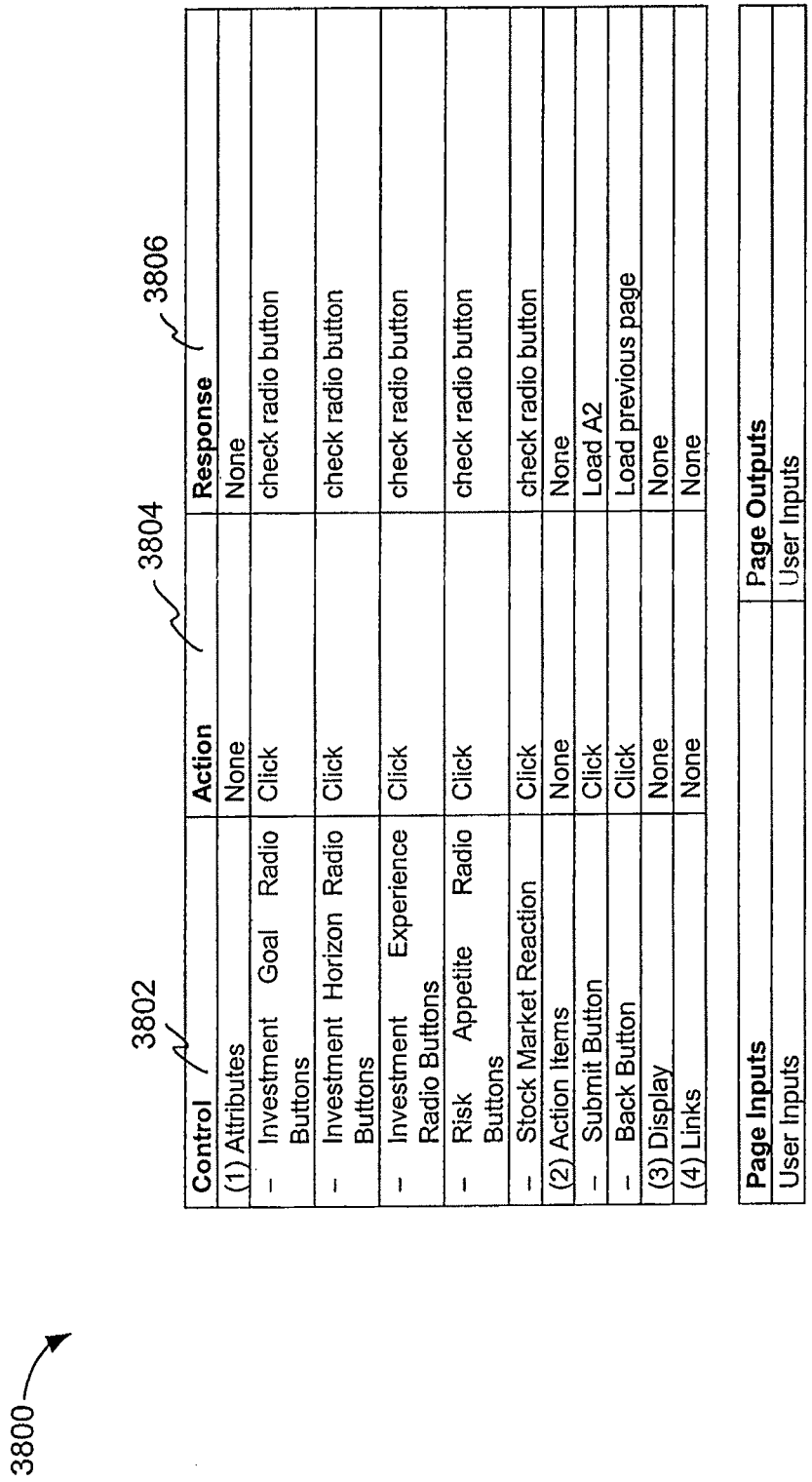
FIG. 38 is a table for controls, actions, and responses of a risk profiler questionnaire page in accordance with an embodiment of the present invention.

FIG. 38 is a table 3800 for controls 3802, actions 3804, and responses 3806 of a risk profiler questionnaire page in accordance with an embodiment of the present invention.

Figure 39:
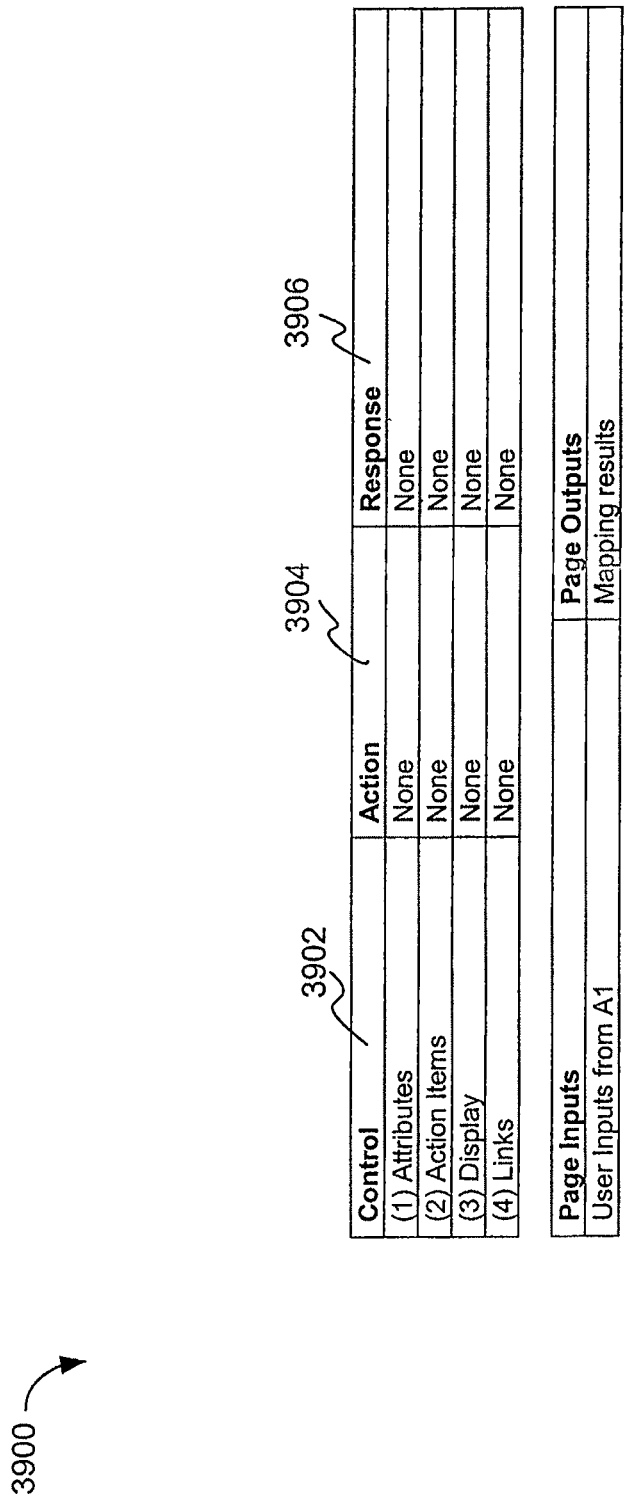
FIG. 39 is a table for controls, actions, and responses of a risk profiler action page in accordance with an embodiment of the present invention.

The risk profiler action page 3604 processes the information from page risk profiler questionnaire page 3602. The answers are then mapped to predefined results. This "desired portfolio" is then saved to the portal database and can be displayed in a web page. FIG. 39 is a table 3900 for controls 3902, actions 3904, and responses 3906 of a risk profiler action page in accordance with an embodiment of the present invention.

Figure 40:
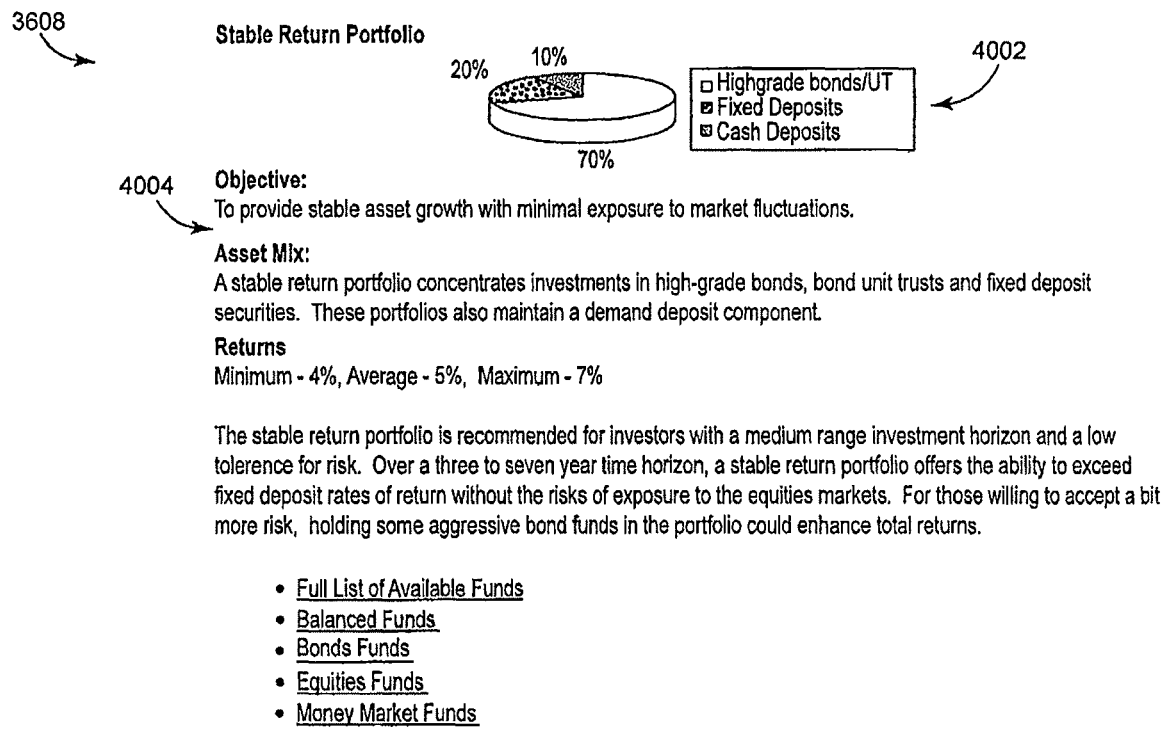
FIG. 40 is a schematic illustration of a risk profiler result page in accordance with an embodiment of the present invention.
Figure 41:
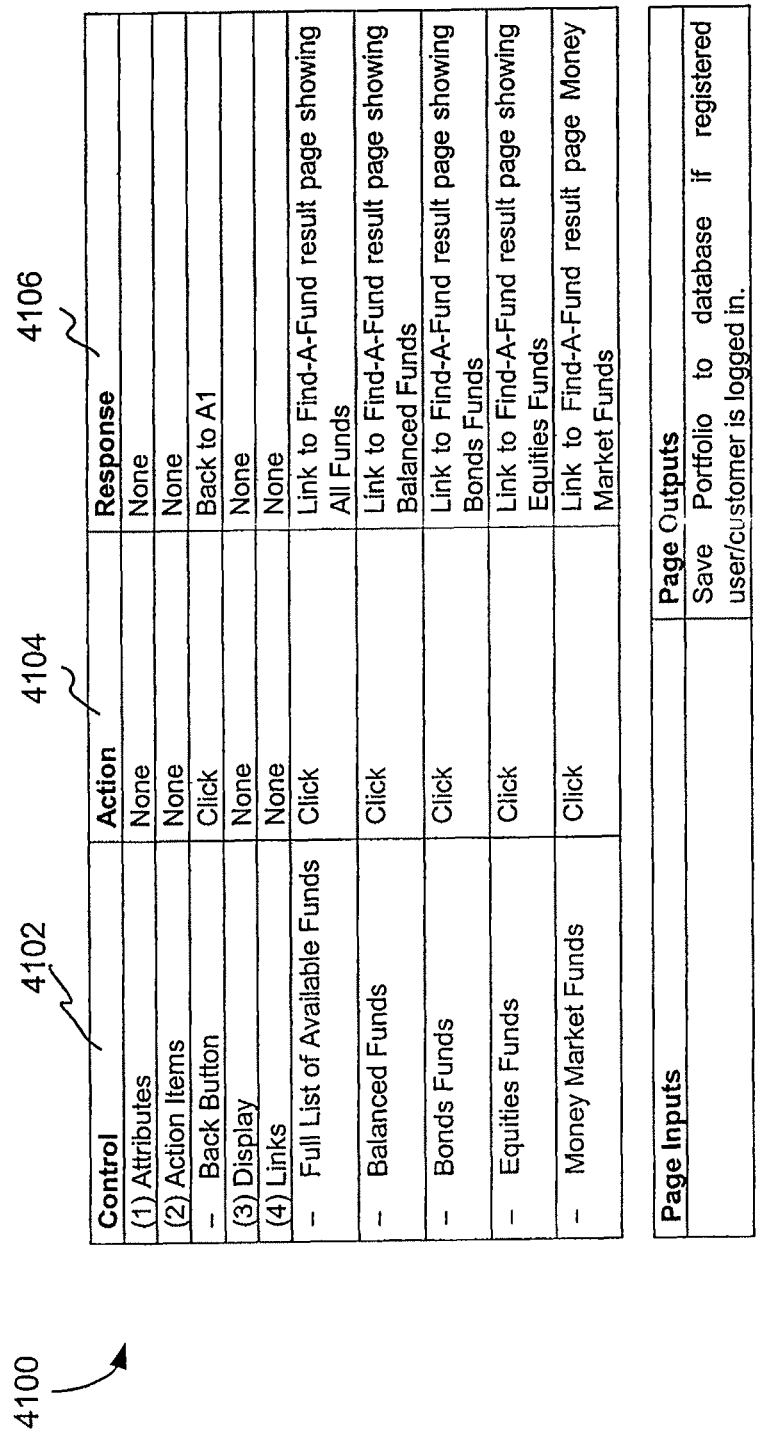
FIG. 41 is a table for controls, actions, and responses of a risk profiler result page in accordance with an embodiment of the present invention.

FIG. 40 is a schematic illustration of a risk profiler result page 3606 in accordance with an embodiment of the present invention. The risk profiler result page 3606 displays the portfolio 4002 and some explanation 4004 for the portfolio that the user should hold. FIG. 41 is a table 4100 for controls 4102, actions 4104, and responses 4106 of a risk profiler result page in accordance with an embodiment of the present invention.

One issue in delivering online banking may be ease of use. Ease of use may be predicated on many factors, including the ability of the user to identify the banking information of interest and execute desired banking tasks without error or difficulty. Often, users may perform four main tasks in checkbook and online banking applications:

Account Management—This activity includes viewing bank account data from the bank, such as cleared transactions and account balances, initiating requests to bank to generate fund transfers between accounts, and supporting tasks such as requesting information from the bank on certain accounts or transactions.

Bill payment—Initiating requests to the bank to pay a vendor a certain amount by a certain date. Related tasks such as making payment inquiries may also be performed.

Checkbook transactions—Accounting for checks, withdrawals, debit card purchases, and the like, that the user does on a regular basis. These transactions must be accounted for and integrated with the account data from the bank for an accurate reflection of the user's account.

Current balance calculation—Determining how much money the user really has available in their account, based on cleared and uncleared transactions (including other checkbook transactions). The current balance may be calculated, typically by the user or sometimes by the application, by taking the latest account balance given by the bank and adding/subtracting any uncleared transactions in the checkbook of the user.

Extensive consumer and usability research indicates two key areas of usability concerns with these various tasks. First, customers may view banking, bill payment and the determination of their current balance as interrelated tasks. Accordingly, they may want related banking task and banking information to operate together in an online banking product. In fact, banking tasks, such as obtaining balance information, cleared transactions, and so forth, may often be used to provide information to support the bill payment tasks.

Second, customers may have difficulty using an online banking system when it is necessary to navigate from one user interface to another user interface in order to complete some task. Navigation difficulties may increase both the time required by the user to complete the task, and the likelihood of error in completing the task.

A typical scenario is payment of bills, which may include a large credit card bill. The user may typically decide how much of the credit card bill to pay based on currently available funds, taking into account cleared transactions, and uncleared transactions, such as other bills being paid. To complete this task with an online banking software product, the user may need to determine current balance in the account based for cleared transactions, review in the checkbook to determine actual current balance, based on the uncleared transactions, and cleared balance, and determine if they need to transfer money from another account to pay the bills. The user may also enter the bill payment requests including, calculating how much of the credit card to pay from the actual balance. Further, the user may use the requests to pay the bills and send the request to transfer funds.

From the user's perspective, this banking activity is clearly an integrated one, since the user may integrate three tasks—writing checks to pay other bills, obtaining cleared transactions and current balance from the bank, and determining a combined current balance based on this information—before writing the credit card bill.

There have been various approaches to making online banking easy for consumers to use for bill payment and checkbook maintenance. These approaches fall mainly into two categories, typically tightly associated with the type of company that is delivering the online banking software and system. Generally, there can be personal finance products from personal finance software companies, and banking products from banks and other financial institutions.

Online banking software products from personal finance software companies can be "checkbook-centric." Personal finance software products may employ the checkbook as the underlying user model. As a result, all transactions, such as paying bills, writing checking, depositing or transferring funds, may be done through a checkbook-like user interface. For example, Quicken.RTM. 5.0, provides a checkbook metaphor for users. For instance, there may be a user interface of the main entry screen for a personal finance software product. The entry screen may have a number of icons that are invoked to perform different functions, such as the checkbook register, online banking, and online bill payment.

Prior to the availability of online banking, the user would enter all of their various transactions into the checkbook register, and then manually reconcile the checkbook register against a printed bank statement. In the checkbook register type user interface the user may see all of their transactions, including both cleared and uncleared transactions mixed together. For example, the first transaction may indicate that it has been cleared while the other transactions may indicate that they are not cleared. Further, the balance may be of all transactions that have been entered by the user, whether cleared or not. The user may not have separate balance information for just the cleared transactions immediately available.

Once online banking became available, this type functionality was added as an additional feature in many checkbook products, to both automate reconciliation of uncleared transactions in the checkbook against the bank's own records of cleared transactions, and to provide electronic, online payment of bills. Typically, an online banking module is provided in which the user can view the bank's current account balance in a user interface display separate from the checkbook register. There may be separate icons for checkbook register and the online banking module. Selecting the online banking icon for the online banking module may cause the display of the online banking user interface. In such an interface, the user may only see the cleared transactions which have been downloaded from the bank. The balance may be based only on the cleared transactions, the bank having no information about the user's recently entered, and uncleared, checkbook transactions.

To use the online information for bill payment, the user may need to download certain transactions to first reconcile their account. Once the transactions are downloaded, the checkbook register may reflect which transactions have cleared. The only difference that appears to the user may be the indication in the checkbook register of which transactions have been cleared. The user may have to switch back and forth between the different user interfaces.

Electronic bill paying, which has often been touted as a desirable feature of online banking systems, may typically be enabled, often as an extension of the checkbook of the user. Bill payments may be treated as checks, and entered in a separate user interface. For example, the interface, which may be invoked from its own icon in the main user interface, may be completely separate from the user interfaces for the online banking module or the checkbook.

In these types of software products, there may be no persistent view of the bank's online statement, as such. The online banking module may essentially be a staging area where the user may view transactions before using them to reconcile their checkbook or pay bills. In this user model the checkbook may be persistent and the online statement may be temporary, since it is only viewed by downloading the information from the bank. Further, in checkbook-centric products, the balance that may be visible throughout the software product may be the ending balance based on the transactions in the checkbook of the user, including both cleared and uncleared transactions. The latest balance of cleared transactions from the bank may typically be visible only within the separate user interface display for the online banking module.

This approach assumes the primacy of the user's checkbook in the user model and system design, and demotes the fact that the bank's own records of the user's account are a necessary component for an overall accurate reflection of account activity. While the bank's own records show the actual balance and cleared transactions of the user, the information may not be presented to the user in single user interface consolidated with the existing information in the checkbook. Rather, the information identifying cleared transactions may merely be propagated into the checkbook, of the user. Further, while bill payment is dependent on both the checkbook and online statement information, that activity and related information may be presented in a completely separate user interface.

The software product may separate checkbook functions, bill payment, and viewing/downloading transactions from the bank into discrete operations, with their own user interfaces. The user may perform four separate tasks, and may navigate multiple user interface screens to achieve what they consider to be the single task of paying bills based on currently available funds.

In the second category of online banking systems are software products and systems provided by banks or their affiliates. These software products can be "bank-statement centric" and may take the bank's statement as the primary user model and interface. These software products may display only transactions that have actually been cleared by the bank. Along with only showing cleared transactions, there may only be provided the balance information for cleared transactions.

These products may not let the user incorporate transactions that have not been posted or cleared by the bank, for example, checks that the user has recently written, or withdrawals or deposits recently made but not posted. These transactions may be a fundamental component of the overall account of the user. The user may not get a complete view of the actual status of his account as the user considers it. The user may instead receive the information about cleared transactions that the bank has actually cleared.

Many on-line banking systems contain information partially identifying the cleared transactions. There may not be information identifying the payee for checks, debits, and point of sale transactions. The user may need to determine which transaction is associated with which payee, and which transactions have cleared. The user may need to correlate check numbers instead. Identification of point of sale transactions may be accomplished by correlating the date and amount, available from the financial institution.

Many of these bank-based software products are specifically intended to show the current cleared balance of the user and the cleared transactions on which it is based. The user may not see the impact of these activities on their accounts until they actually clear the bank. The effect of transactions on the balance of the account of the user may not be reflected in the user interface of the product. The user also may not be able to enter into the online system other transactions such as hand-written checks or calculate a running balance based on both clear and uncleared transactions. To do these latter activities, the user may need to download the cleared transaction data from the online banking product and import it into another personal finance product. For example, the user may download cleared transactions into a specific file format. The user may then use a separate personal finance application or spreadsheet to actually integrate the cleared transaction data with their checkbook of uncleared transactions.

Users of these various types of online banking products may need to navigate between multiple different user interfaces to perform a single task. Two types of users of financial software products may be categorized as: Organizers and Transactors. Organizers specifically intend to use their financial software products to organize, categorize, and track their finances with precision and detailed accuracy. For these types of users, conventional software products that provide the ability to categorize transactions, produce complex reports of income and expenses, and the like are often seen as useful tools.

Transactors mainly want to pay bills and avoid overdrafts of their accounts. Transactors are typically not interested in categorizing transactions, tracking all income and expenses, or obtaining complex reports and summaries. To date, conventional software products have been designed almost exclusively with Organizers as the intended users. Specifically, because Transactors are concerned with avoiding overdrafts, existing products and systems that do not provide an integrated view of both cleared transactions from the bank and uncleared transactions in the user's account, along with a current balance, may not meet the Transactor's need for an easy-to-use financial software product.

Organizers and Transactor's may desire an integration of all of the relevant information about a user's account—the checkbook of uncleared transactions, cleared transactions, pending bill payments, fund transfers, and other transactions—in a single user interface display. Both types of users of financial software may find it desirable to provide on an online banking software product and system that tightly integrates bill payment, account management, and determination of current balances, into a single user interface display.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for providing a financial service to a customer of a financial institution, comprising:

displaying, via a computer system of a third party, an electronic banking service of the financial institution, wherein the third party is distinct from the financial institution;

displaying, via the third party computer system, information associated with financial products and services of the third party;

providing, via the third party computer system, an integrated interface to the electronic banking service of the financial institution and the financial products and services of the third party;

displaying, via the third party computer system, financial advisory content related to the financial products and services through at least one of fund selection tools, asset allocation tools, portfolio tracking and planning tools, and financial calculators;

receiving, via the third party computer system, instructions from the customer to initiate a payment to a payee, wherein the customer and the payee each has a plurality of payment accounts with different financial institutions distinct from the third party;

determining, via the third party computer system, that the payee and the customer each has a payment account with a common financial institution;

automatically selecting, by the third party computer system, the payment account with the common financial institution from among the plurality of payment accounts for each one of the customer and the payee;

transmitting, via the third party computer system, an instruction to the common financial institution to adjust account balances of the payment account of the payee with the common financial institution and the payment account of the customer with the common financial institution; and notifying the customer, via the third party computer system, that the payment has been initiated.

2. The method of claim 1, further including:

providing, via the computer system, a personalized portal within the electronic banking service, said personalized portal providing at least one of personal finance management information, a find-a-fund function, a find-a-loan function, a news portal, an investments buyer's guide, and an insurance buyer's guide.

3. The method of claim 1, wherein receiving the instructions from the customer includes:

receiving, from the customer, an application to purchase the financial products or services.

4. The method of claim 1, wherein the financial products and services include at least one of credit cards, loans, insurance, and investments.

5. The method of claim 1, wherein the customer accounts include one or more investment accounts, one or more banking accounts, one or more insurance products, and a buyer's advocate function.

6. The method of claim 5, wherein the banking accounts include at least one of a credit card account, a deposit account, and a loan, and wherein the banking services include at least one of an account statement, bill payment, and a fund transfer.

7. The method of claim 5, wherein the investment accounts include at least one of unit trust products and brokerage link services.

8. A computer-readable medium containing instructions operable to cause a computer system to perform a method for providing a financial service to a customer of a financial institution, the method comprising:

displaying, via the computer system, an electronic banking service of the financial institution, wherein the computer system is associated with a third party distinct from the financial institution;

displaying, via the third party computer system, information associated with financial products and services of the third party;

providing, via the third party computer system, an integrated interface to the electronic banking service of the financial institution and the financial products and services of the third party;

displaying, via the third party computer system, financial advisory content related to the financial products and services through at least one of fund selection tools, asset allocation tools, portfolio tracking and planning tools, and financial calculators;

receiving, via the third party computer system, instructions from the customer to initiate a payment to a payee, wherein the customer and the payee each has a plurality of payment accounts with different financial institutions distinct from the third party;

determining, via the third party computer system, whether the payee and the customer each has a payment account with a common financial institution;

when both the payee and the customer have payment accounts with a common financial institution, automatically selecting, by the third party computer system, the payment account with the common financial institution from among the plurality of payment accounts for each one of the customer and the payee, and transmitting an instruction to the common financial institution to adjust account balances of the payment account of the payee with the common entity financial institution and the payment account of the customer with the common financial institution;

when the payee and the customer do not both have payment accounts with a common financial institution, transmitting, via the third party computer system, an instruction to an automated clearing house to withdraw the payment from a payment account of the customer with a first financial institution and to deposit the payment to a payment account of the selected payee with a second financial institution; and notifying the customer, via the third party computer system, that he payment has been initiated.

9. The computer-readable medium of claim 8, the method further including:

providing, via the computer system, a personalized portal within the electronic banking service, said personalized portal providing at least one of personal finance management information, a find-a-fund function, a find-a- loan function, a news portal, an investments buyer's guide, and an insurance buyer's guide.

10. The computer-readable medium of claim 8, wherein receiving the instructions from the customer includes:
receiving, from the customer, an application to purchase the financial products or services.

11. The computer-readable medium of claim 8, wherein the financial products and services include at least one of credit cards, loans, insurance, and investments.

12. The computer-readable medium of claim 8, wherein the customer accounts includes one or more investment accounts, one or more banking accounts, one or more insurance products, and a buyer's advocate function.

13. The computer-readable medium of claim 12, wherein the banking accounts include at least one of a credit card account, a deposit account, and a loan, and wherein the banking services include at least one of an account statement, bill payment, and a fund transfer.

14. The computer-readable medium of claim 12, wherein the investment accounts include at least one of unit trust products and brokerage link services.

15. A system for providing a financial service to a customer of a financial institution,
wherein the system is associated with a third party distinct from the financial institution and comprises:
at least one memory to store data and instructions; and
at least one processor configured to access the at least one memory and, when executing the instructions, to:
cause an electronic banking service of the financial institution to be displayed to the customer;
cause information associated with financial products and services of the third party to be displayed to the customer;
provide the customers with an integrated interface to the electronic banking service of the financial institution and the financial products and services of the third party;
cause financial advisory content to be displayed to the customer, wherein the financial advisory content is related to the financial products and services through at least one of fund selection tools, asset allocation tools, portfolio tracking and planning tools, and financial calculators;
receive instructions from the customer to initiate a payment to a payee, wherein the customer and the payee each has a plurality of payment accounts with different financial institutions distinct from the third party;
determine whether the payee and the customer each has a payment account with a common financial institution;
when both the payee and the customer have payment accounts with a common financial institution, automatically select the payment account with the common financial institution from among the plurality of payment accounts for each one of the customer and the payee, and transmit an instruction to the common financial institution to adjust account balances of the payment account of the payee with the common financial institution and the payment account of the customer with the common financial institution;
when the payee and the customer do not both have payment accounts with a common financial institution, transmit an instruction to an automated clearing house to withdraw the payment from a payment account of the customer with a first financial institution and to deposit the payment to a payment account of the selected payee with a second financial institution; and
notify the customer that the payment has been initiated.

16. The system of claim 15, wherein the at least one processor is further configured to:
provide a personalized portal within the electronic banking service, said personalized portal providing at least one of personal finance management information, a find-a-fund function, a find-a-loan function, a news portal, an investments buyer's guide, and an insurance buyer's guide.

17. The system of claim 15, wherein when the at least one processor is configured to receive the instructions from the customer, the at least one processor is further configured to:
receive, from the customer, an application to purchase the financial products or services.

18. The system of claim 15, wherein the financial products and services include at least one of credit cards, loans, insurance, and investments, 19. The system of claim 15, wherein the customer accounts include at least one or more investment accounts, one or more banking accounts, one or more insurance products, and a buyer's advocate function.

20. The system of claim 19, wherein the banking accounts include at least one of a credit card account, a deposit account, and a loan, and wherein the banking services include at least one of an account statement, bill payment, and a fund transfer.

21. The system of claim 19, wherein the investment accounts include at least one of unit trust products and brokerage link services.

* * * * *

UNITED STATES PATENT AND TRADEMARK OFFICE
CERTIFICATE OF CORRECTION

PATENT NO. : 8,712,804 B2  
APPLICATION NO. : 12/878682  
DATED : April 29, 2014  
INVENTOR(S) : Kennard L. Wottowa et al.

Page 1 of 1

It is certified that error appears in the above-identified patent and that said Letters Patent is hereby corrected as shown below:

In the Claims:

In claim 1, column 25, line 36, "each has" should read --each have--.

In claim 1, column 25, line 40, "each has" should read --each have--.

In claim 8, column 26, line 35, "each has" should read --each have--.

In claim 8, column 26, line 39, "each has" should read --each have--.

In claim 8, column 26, line 49, "common entity financial institution" should read --common financial institution--.

In claim 8, column 26, line 61, "that he payment" should read --that the payment--.

In claim 12, column 27, line 11, "accounts includes" should read --accounts include--.

In claim 15, column 27, line 46, "each has" should read --each have--.

Signed and Sealed this  
Fifth Day of August, 2014

Michelle K. Lee  
*Deputy Director of the United States Patent and Trademark Office*